United States Patent
Sato et al.

(10) Patent No.: US 11,231,133 B2
(45) Date of Patent: Jan. 25, 2022

(54) TUBE FITTING AND TUBE FITTING STRUCTURE

(71) Applicant: NJT COPPER TUBE CORPORATION, Toyokawa (JP)

(72) Inventors: Yoshio Sato, Nagoya (JP); Hiroyuki Wakabayashi, Nagoya (JP); Koji Kanamori, Tokyo (JP)

(73) Assignee: NJT COPPER TUBE CORPORATION, Toyokawa (JP)

( * ) Notice: Subject to any disclaimer, the term of this patent is extended or adjusted under 35 U.S.C. 154(b) by 0 days.

(21) Appl. No.: 16/745,126

(22) Filed: Jan. 16, 2020

(65) Prior Publication Data

US 2020/0149664 A1    May 14, 2020

Related U.S. Application Data

(63) Continuation of application No. PCT/JP2018/026162, filed on Jul. 11, 2018.

(30) Foreign Application Priority Data

Jul. 26, 2017  (JP) .............................. JP2017-144225

(51) Int. Cl.
  *F16L 13/16* (2006.01)
  *F16L 13/14* (2006.01)
  *F16L 57/02* (2006.01)

(52) U.S. Cl.
  CPC ........... *F16L 13/161* (2013.01); *F16L 13/142* (2013.01); *F16L 57/02* (2013.01)

(58) Field of Classification Search
  CPC ....... F16L 13/122; F16L 13/142; F16L 13/14; F16L 13/161

(Continued)

(56) References Cited

U.S. PATENT DOCUMENTS 2,489,890 A * 11/1949 Hufferd ................. F16L 33/207
                                                                                   285/256
2,768,844 A * 10/1956 Schadeberg ............ F16L 31/00
                                                                                   285/148.18

(Continued)

FOREIGN PATENT DOCUMENTS

DE          2418625 A1    10/1975
DE     103 31 381 A1     3/2004

(Continued)

OTHER PUBLICATIONS

Sep. 25, 2018 International Search Report issued in International Patent Application No. PCT/JP2018/026162.

(Continued)

*Primary Examiner* — David Bochna
(74) *Attorney, Agent, or Firm* — Oliff PLC

(57) ABSTRACT

Provided are a mechanical tube fitting for preventing bending fracture of a tube member to be joined when subjected to bending deformation, and a simple tube fitting structure including that tube fitting. In the tube fitting, a clearance between a tube member (32) to be joined and an outer pipe (12) or an inner pipe (14) which is coaxially inserted in the outer pipe (12) and gives a space between its outer surface and the inner surface of the outer pipe (12), in which space the tube member (32) is inserted, is sealed with a sealing member disposed between the outer pipe (12) and the inner pipe (14), and the above-mentioned components are fixed by caulking. The outer pipe (12) is configured to extend outwardly in its axial direction than the ends of the inner pipe (14).

21 Claims, 13 Drawing Sheets

(58) Field of Classification Search
 USPC .......................................................... 285/382
 See application file for complete search history.

(56) References Cited

U.S. PATENT DOCUMENTS

| | | | | |
|---|---|---|---|---|
| 3,433,505 | A * | 3/1969 | Weatherhead | F16L 25/14 |
| | | | | 285/148.18 |
| 3,572,768 | A * | 3/1971 | James | B21D 39/042 |
| | | | | 285/3 |
| 3,690,703 | A * | 9/1972 | Philipps | F16L 33/2071 |
| | | | | 285/148.18 |
| 5,378,023 | A * | 1/1995 | Olbrich | B21D 39/04 |
| | | | | 285/24 |
| 5,387,016 | A * | 2/1995 | Joseph | F16L 33/2076 |
| | | | | 285/148.16 |
| 6,099,045 | A * | 8/2000 | Pirona | F16L 13/143 |
| | | | | 285/256 |
| 6,581,983 | B1 | 6/2003 | Viegener | |
| 6,874,823 | B2 * | 4/2005 | Viegener | F16L 13/143 |
| | | | | 285/242 |
| 7,384,074 | B2 * | 6/2008 | He | F16L 13/143 |
| | | | | 285/242 |
| 7,806,442 | B2 * | 10/2010 | Baxi | B60H 1/00571 |
| | | | | 285/242 |
| 8,118,331 | B2 * | 2/2012 | Yamashita | F16L 47/24 |
| | | | | 285/256 |
| 2003/0197372 | A1 * | 10/2003 | Hoff | F16L 33/2076 |
| | | | | 285/256 |
| 2008/0284164 | A1 * | 11/2008 | Kerin | F16L 33/207 |
| | | | | 285/256 |
| 2016/0131287 | A1 | 5/2016 | Cloos et al. | |
| 2017/0234464 | A1 * | 8/2017 | Lawrence | F16L 13/142 |
| | | | | 285/382 |
| 2020/0309289 | A1 * | 10/2020 | Stogdill | F16L 13/147 |

FOREIGN PATENT DOCUMENTS

| | | |
|---|---|---|
| DE | 10 2007 042 606 A1 | 3/2009 |
| EP | 0 582 543 A1 | 2/1994 |
| EP | 0 774 611 A1 | 5/1997 |
| EP | 1245887 A1 * 10/2002 ............ F16L 13/143 |
| EP | 1 424 523 A1 | 6/2004 |
| EP | 1 580 324 A1 | 9/2005 |
| EP | 3 021 026 A1 | 5/2016 |
| JP | S50-136023 U | 11/1975 |
| JP | S50-136024 U | 11/1975 |
| JP | H10-82487 A | 3/1998 |
| JP | H11-141760 A | 5/1999 |
| JP | 2003-524132 A | 8/2003 |
| JP | 2018-017293 A | 2/2018 |
| WO | 98/11377 A1 | 3/1998 |

OTHER PUBLICATIONS

Mar. 5, 2021 Extended European Search Report issued in European Patent Application No. 18838798.9.

* cited by examiner

TUBE FITTING AND TUBE FITTING STRUCTURE

CROSS REFERENCE TO RELATED APPLICATION

This application is a continuation of the International Application No. PCT/JP2018/026162 filed on Jul. 11, 2018, which claims the benefit under 35 U.S.C. § 119(a)-(d) of Japanese Application No. 2017-144225 filed on Jul. 26, 2017, the entireties of which are incorporated herein by reference.

BACKGROUND OF THE INVENTION

Field of the Invention

The present invention relates to a tube fitting and a tube fitting structure. More particularly, the invention relates to a pressure-resistant tube fitting which is suitable for joining a piping or tube member subjected to a flow of fluid under high pressure, such as a refrigerant piping in an air conditioner, and a pressure-resistant tube fitting structure including the tube fitting.

Description of Related Art

Various tube fittings or joints called socket, adapter, tees, T-shaped, Y-shaped, cross-shaped and 90° elbow have been widely used for connecting a transportation piping of fluid such as a liquid or a gas to another piping or to an intended apparatus. For example, connecting constructions of a water piping, a piping in a water heater, a refrigerant piping in an air conditioner are conducted by using such tube fittings.

Meanwhile, these kinds of tube fittings are generally subjected to a brazing method in which a piping or tube member to be joined is fixed with a fitting by brazing. However, the method cannot be employed for a joining operation at a piping site such as an attic, because the method requires use of the fire.

For this reason, various tube fitting structures for mechanically joining the tube member and the fitting without using the fire as in the case of brazing have been proposed. For example, JPH11-141760A discloses a joining structure in which an end portion of a copper pipe to be joined is extended in diameter, and fitted to an outer surface of a cylindrical portion of the fitting. A part of the copper pipe with the extended diameter corresponding to a circular groove formed around the cylindrical portion of the fitting is caulked into the circular groove, so that the fitting and the copper pipe are fixedly joined. Furthermore, JP2003-524132A discloses a joining structure in which an end portion of a tube member is fitted into an inside of a cylindrical fitting to form a double-pipe structure. The double-pipe structure has a seal ring in a clearance between the tube member and the fitting, and doubled portions of the structure located at both sides of the seal ring are simultaneously pressed. The doubled portions are thus caulked and subjected to plastic deformation, whereby the tube member and the fitting are joined with each other.

The method in which the doubled portion formed by fixing the fitting and the tube member is caulked and joined has an advantage that the joining operation is simple and easy, because the joining of the fitting and the tube member is permitted by a mere caulking operation. However, such a fitting structure is not satisfactory for a tube member to be joined whose inside is subjected to a flow of fluid having a relatively high pressure, for example a refrigerant piping for an air conditioner. That is, the higher the pressure of the fluid flowing through the tube member, the larger pull-out force acting on the tube member. For example, about 4 MPa of a refrigerant pressure may undesirably cause the pull-out of the tube member from the fitting.

A tube fitting J having the double-pipe structure as shown in FIG. 16 has been also studied for joining the tube fitting with the tube member by caulking. The double-pipe structure of the tube fitting J is achieved by inserting an inner pipe Ti in an outer pipe To, and caulking the pipes at their axially central portion, so as to integrally join the pipes. End portions of tube members P1, P2 to be joined are fitted into a space formed between the outer pipe To and the inner pipe Ti at their respective opposite ends, and caulked at the end portions of the outer pipe To, which portions are indicated by a blank arrow, so that the two tube members P1, P2 are connected together. To seal a clearance between the tube members P1, P2 and the outer pipe To, an O-ring S is disposed.

At the time of connecting work of the tube member by means of the tube fitting J having the above-mentioned structure, the tube member may have to be bent for obtaining the view or working space. It is also possible that a worker may accidentally use the tube member as a scaffold so as to put a load such as the weight of the worker to the tube member, whereby bending force is applied to the tube member to cause bending deformation thereof in the radial direction (a direction perpendicular to the axis of the tube member), and the end portion of the tube fitting J becomes a fulcrum of the bending in that case, as shown in FIG. 17. The singular point (end of the tube fitting) is thus present in a portion near the circular area subjected to bending tensile stress, and the stress is likely to concentrate on the singular point. As a result, the tube members P1, P2 suffer from a problem of their fracture or breakage in proximity of the end of the tube fitting J to cause leakage of the refrigerant and the water flowing through the tube members, from the fracture point B. The larger the diameters of the tube members P1, P2, the more serious the problem caused by the bending deformation in the radial direction becomes.

SUMMARY OF THE INVENTION

The present invention was completed in view of the background art described above. Therefore, a problem to be solved by the present invention is to provide a mechanical tube fitting with which bending fracture of a tube member to be joined is advantageously prevented even when subjected to bending deformation. It is another problem to be solved by the invention to provide a simple tube fitting structure for joining a tube member by using the tube fitting.

In order to solve the above-mentioned problems, the present invention provides a tube fitting comprising: an outer pipe; an inner pipe which is coaxially inserted in the outer pipe, and has such an outer diameter that gives a space between an outer surface of the inner pipe and an inner surface of the outer pipe, in which space a tube member to be joined is inserted; and a sealing means disposed between the outer pipe and the inner pipe, the sealing means being configured to seal a clearance between the tube member inserted in the space and the outer pipe or the inner pipe, and the outer pipe, the tube member and the inner pipe being fixedly engaged by caulking, wherein the outer pipe extends outwardly in its axial direction further than an end of the inner pipe, and wherein a length: L (mm) of extension of the outer pipe from the end of the inner pipe and an outer diameter: D (mm) of the tube member satisfy the following formula: L≥0.4× D−6.25.

According to one preferable mode of the tube fitting according to the invention, the tube member has an outer diameter (D) of not less than 19 mm, whereby the object of the invention is further preferably achieved.

The tube fitting according to the invention is configured such that the inner pipe has a first caulking engagement portion on an outer circumferential part of its end, the first caulking engagement portion having a stepped shape with a larger diameter than that of a central portion of the inner pipe, and an end of the tube member is inserted in the space between the outer pipe and the inner pipe, and the outer pipe and the tube member are caulked at a part located axially inside than the first caulking engagement portion, whereby the outer pipe, the tube member and the inner pipe are fixedly engaged.

According to another preferable mode of the tube fitting according to the invention, the first caulking engagement portion formed on the outer circumferential part of the end of the inner pipe has a guiding surface having a curved convex shape or tapered shape.

In addition, according to still another preferable mode of the tube fitting according to the invention, an accommodating concave is formed in the outer pipe so as to open to its inside and extend in its circumferential direction, and an O-ring as the sealing means is fitted and accommodated in the accommodating concave so as to be pressed against an outer surface of the tube member inserted in the outer pipe, thereby permitting a seal between the tube member and the outer pipe.

In the tube fitting according to the invention, it is preferred that a part of the inner pipe corresponding to the accommodating concave for the O-ring in the outer pipe has a larger diameter than that of the portion a central portion of the inner pipe to thereby form a second caulking engagement portion having a stepped shape, and wherein caulking is performed in each side of the second caulking engagement portion in its axial direction, thereby permitting the seal between the outer pipe and the tube member.

According to one of the preferable modes of the invention, a stopper is formed integrally on the inner surface of the outer pipe or the outer surface of the inner pipe, the stopper being contacted with an end of the tube member so as to determine a length of insertion of the tube member.

According to another preferable mode of the invention, the stopper is a ring-shaped projection continuously extending in a circumferential direction of the inner pipe, the ring-shaped projection being integrally formed on an outer circumferential surface of the inner pipe with a height not to contact with an inner circumferential surface of the outer pipe.

Furthermore, according to another one of the preferable modes of the tube fitting according to the invention, at least one cutout crossing the ring-shaped projection is formed, and the end of the tube member is contacted with the at least one cutout, so that clearances located inside and outside the tube member is allowed to communicate with each other through the at least one cutout.

Besides, in the tube fitting according to the invention, a joining concave is formed on an outer circumferential surface of the portion a central portion of the inner pipe, and, while the inner pipe is inserted in the outer pipe, a part of a pipe wall of the outer pipe corresponding to the joining concave is deformed to protrude inwardly in a radial direction of the pipe, so that the protruded part is fitted into the joining concave to determine a relative position of the outer pipe and the inner pipe, and fix the outer pipe and the inner pipe together.

In the invention, the joining concave is constituted by a space between two ring-shaped projections integrally formed on the outer circumferential surface of the inner pipe, the ring-shaped projections serving as stoppers to which an end of the tube member is contacted so as to determine a length of insertion of the tube member.

Additionally, according to another preferable mode of the invention, a single ring-shaped projection with a given width is integrally formed on the outer circumferential surface of the central portion in the axial direction of the inner pipe, and a groove giving the joining concave is formed on a top surface of the single ring-shaped projection continuously in the circumferential direction of the inner pipe, and a side surface of the single ring-shaped projection serves as a stopper to which an end of the tube member is contacted so as to determine a length of insertion of the tube member.

According to a desirable mode of the tube fitting according to the invention, the tube fitting is disposed in each of the opposite end portions of the outer pipe and the inner pipe, and two of the tube members are fixed by caulking at their opposite ends to the respective opposite end portions of the outer pipe and the inner pipe, so that the tube members are connected with each other.

According to another desirable mode of the tube fitting according to the invention, on connecting two of the tube members, one of the two tube members is utilized as the outer pipe, and the inner pipe is coaxially inserted and positioned in the one of the two tube members.

Furthermore, according to still another desirable mode of the tube fitting according to the invention, on connecting a plurality of the tube members, the outer pipe has a plurality of openings corresponding to the plurality of the tube members, and the inner pipe is coaxially inserted and positioned in each of the plurality of openings.

It is the gist of the invention to provide a tube fitting structure obtained by joining a given tube member by means of the above-mentioned tube fitting, wherein caulking is performed while an end of the tube member is inserted in a circular space formed between the outer pipe and the inner pipe, whereby the outer pipe, the tube member and the inner pipe are fixedly engaged.

It is another gist of the invention to provide a tube fitting structure obtained by connecting two tube members by means of the above-mentioned tube fitting, wherein the tube fitting is formed by utilizing each of the opposite end portions of the outer pipe and the opposite end portions of the inner pipe, and wherein caulking is performed while each of the ends of the two tube members is inserted in a circular space formed between each of the opposite end portions of the outer pipe and the inner pipe, whereby each of the two tube members is fixedly engaged to the corresponding opposite end portion of the outer pipe and the inner pipe.

It is still another gist of the invention to provide a tube fitting structure obtained by connecting two tube members by means of the above-mentioned tube fitting, wherein one of the two tube members is utilized as the outer pipe, and the inner pipe is coaxially inserted and positioned in an opening at an end of the one of the tube members to thereby form the tube fitting, and wherein caulking is performed while an end of the other of the two tube members is inserted in a circular space formed between an opening at the end of the one of the tube members in the tube fitting and the inner pipe, whereby the one of the tube members, the inner pipe and the other of the tube members are fixedly engaged.

Additionally, it is also the gist of the invention to provide a tube fitting structure obtained by connecting a plurality of tube members by means of the above-mentioned tube fitting, wherein the outer pipe has a plurality of openings corresponding to the plurality of tube members, and the inner pipe is coaxially inserted and positioned in each of the plurality of openings to thereby form the tube fitting, and wherein caulking is performed while an end of each of the plurality of tube members is inserted in a circular space formed between the plurality of openings of the outer pipe and the inner pipe, whereby each of the openings in the outer pipe, the tube members and the inner pipe are fixedly engaged.

The above-mentioned tube fitting according to the present invention is simply composed of the outer pipe, the inner pipe and the sealing means, so as to require only a small number of components. Therefore, the tube fitting is a mechanical fitting with a simple structure, thereby naturally and significantly contributing to reduction of its production cost, and also permitting a simple and easy joining operation of the tube members.

Furthermore, in the tube fitting according to the invention, the outer pipe extends further than the end of the inner pipe with a given length. For this reason, when the tube member in the joined state is subjected to a load in the radial direction, that is, a direction perpendicular to an axis of the tube member, at the time of piping construction and so on, a generation point of buckling caused to the tube member, that is, the bending center is transferred from the end of the inner pipe outwardly in its axial direction so as to be in proximity of the end of the outer pipe. Thus, the most stretched part of the tube member corresponding to the generation point of buckling is also transferred from the end of the inner pipe outwardly in its axial direction, so that an extreme bending deformation starting from the end of the inner pipe is prevented. The tube member is instead subjected to a gradual bending deformation, thereby advantageously resolving or preventing a problem that the tube member is broken in proximity of the tube fitting to thereby cause leakage of the fluid such as the refrigerant, the water and the like flowing through the tube member.

Besides, in the tube fitting and the tube fitting structure using the tube fitting according to the invention, the end of the tube member is inserted in the space formed between the outer pipe and the inner pipe, and the outer pipe, the tube member and the inner pipe are fixedly engaged by caulking. In particular, the first caulking engagement portion may be formed on the outer circumferential part of the end of the inner pipe, and/or the second caulking engagement portion may be formed on the part of the inner pipe corresponding to the accommodating concave for the O-ring as the sealing means, such that the outer pipe and the tube member are fixed by caulking to those caulking engagement portions. The tube member joined to the tube fitting under this configuration is resistant to a force acting to pull out the tube member, and is prevented from being easily pulled out even when subjected to the flow of fluid like the refrigerant having high pressure. Thus, the tube member effectively exhibits a remarkable resistance to the pull-out force.

BRIEF DESCRIPTION OF THE DRAWINGS

FIGS. 1A and 1B are explanatory views showing one example of a tube fitting according to the present invention, wherein FIG. 1A is an explanatory view showing an outer pipe in its longitudinal section, and FIG. 1B is an enlarged view of a portion A of FIG. 1A;

FIGS. 2A and 2B are explanatory views showing the outer pipe used for the tube fitting in FIGS. 1A and 1B, wherein FIG. 2A is its front view, and FIG. 2B is its longitudinal sectional view;

FIGS. 3A, 3B and 3C are explanatory views showing an inner pipe used for the tube fitting in FIGS. 1A and 1B, wherein FIG. 3A is its front view, FIG. 3B is its longitudinal sectional view, and FIG. 3C is an enlarged view of a portion B of FIG. 3B;

FIGS. 10C and 10D are enlarged views of portions C and D of FIG. 10B respectively;

FIGS. 12A, 12B and 12C are explanatory views showing one example in which a ring-shaped projection of the inner pipe shown in FIGS. 3A, 3B and 3C has a cutout, wherein FIG. 12A is a part of its explanatory front view, FIG. 12B is an explanatory cross sectional view taken along a line D-D in FIG. 12A, and FIG. 12C is a part of an enlarged explanatory cross sectional view taken along a line E-E in FIG. 12B;

FIGS. 13A, 13B and 13C are explanatory views showing a configuration of the cutout in another example of the ring-shaped projection integrally formed on the outer circumferential surface of the inner pipe shown in FIGS. 10A, 10B, 10C and 10D, wherein FIG. 13A is a part of its explanatory front view, FIG. 13B is an explanatory cross sectional view taken along a line F-F in FIG. 13A, and FIG.

Figure 1A:
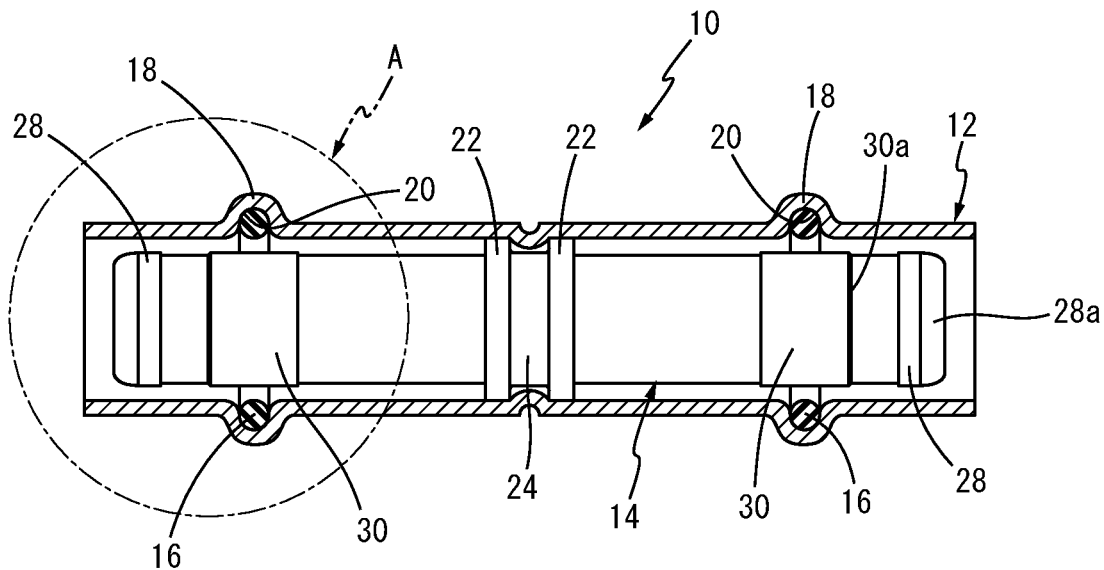
Figure 11:
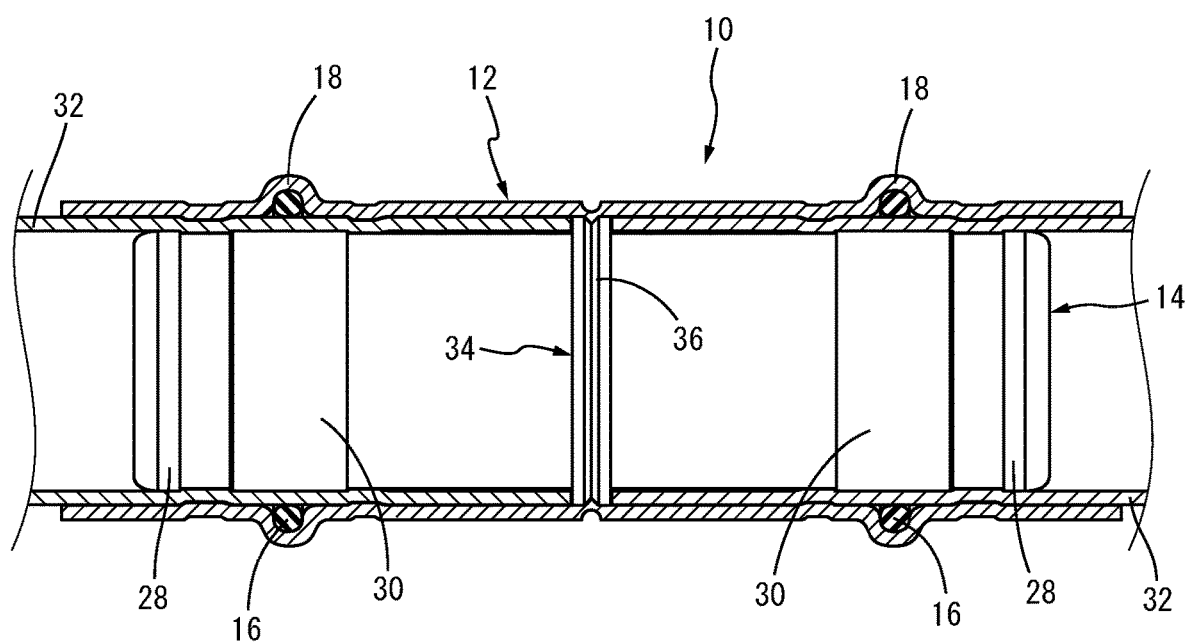
FIG. 11 is an explanatory cross sectional view corresponding to FIG. 6, showing a state where the inner pipe shown in FIGS. 10A, 10B, 10C and 10D is assembled to the outer pipe shown in FIGS. 2A and 2B, and the outer pipe is caulked with the tube member being inserted therein.
Figure 13A:
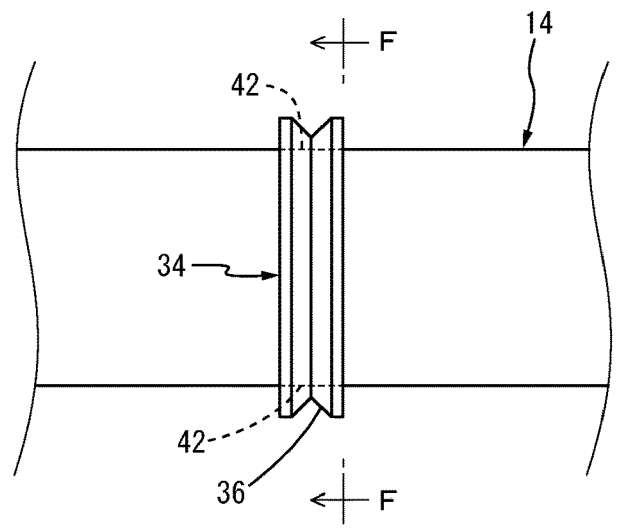
Figure 13B:
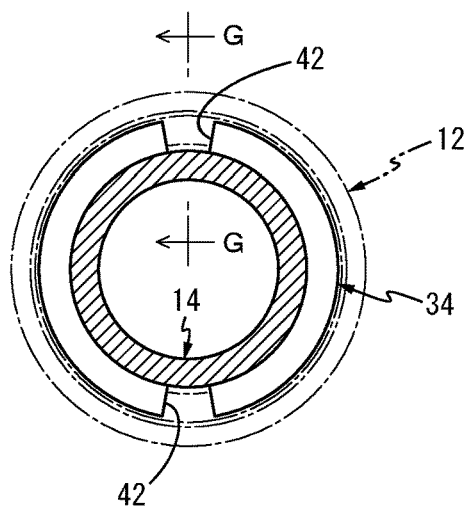
Figure 14A:
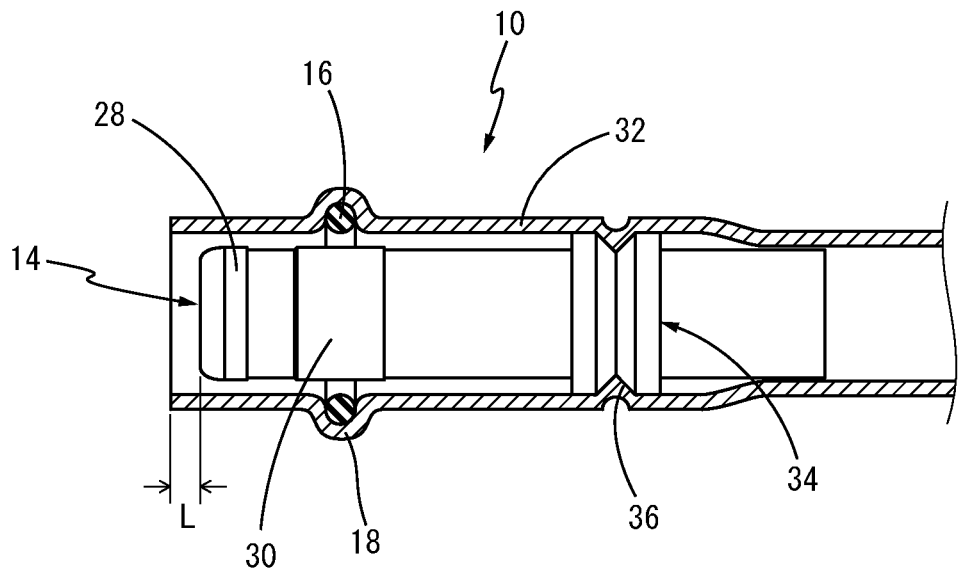
Figure 14B:
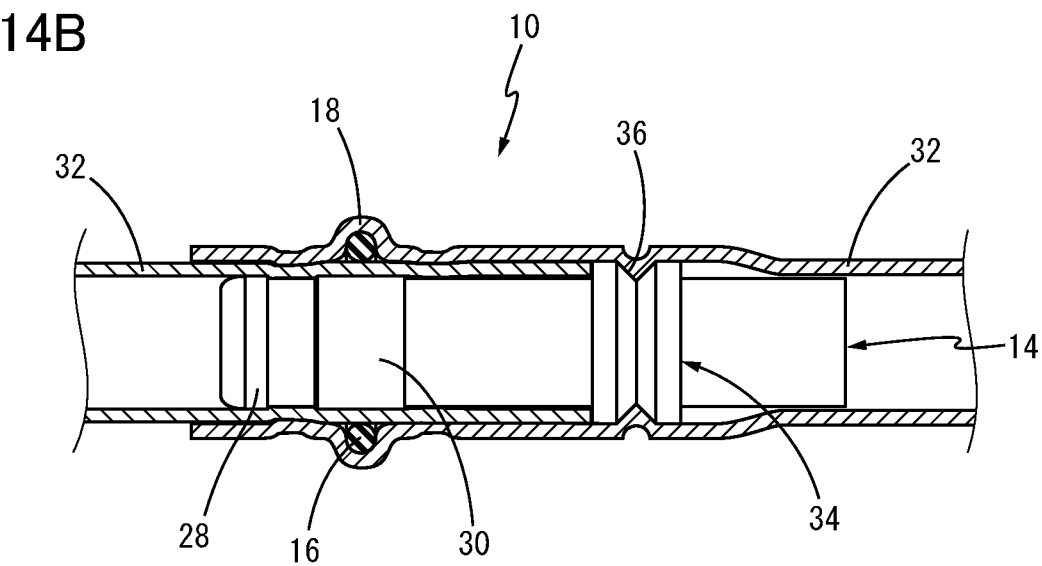
Figure 15:
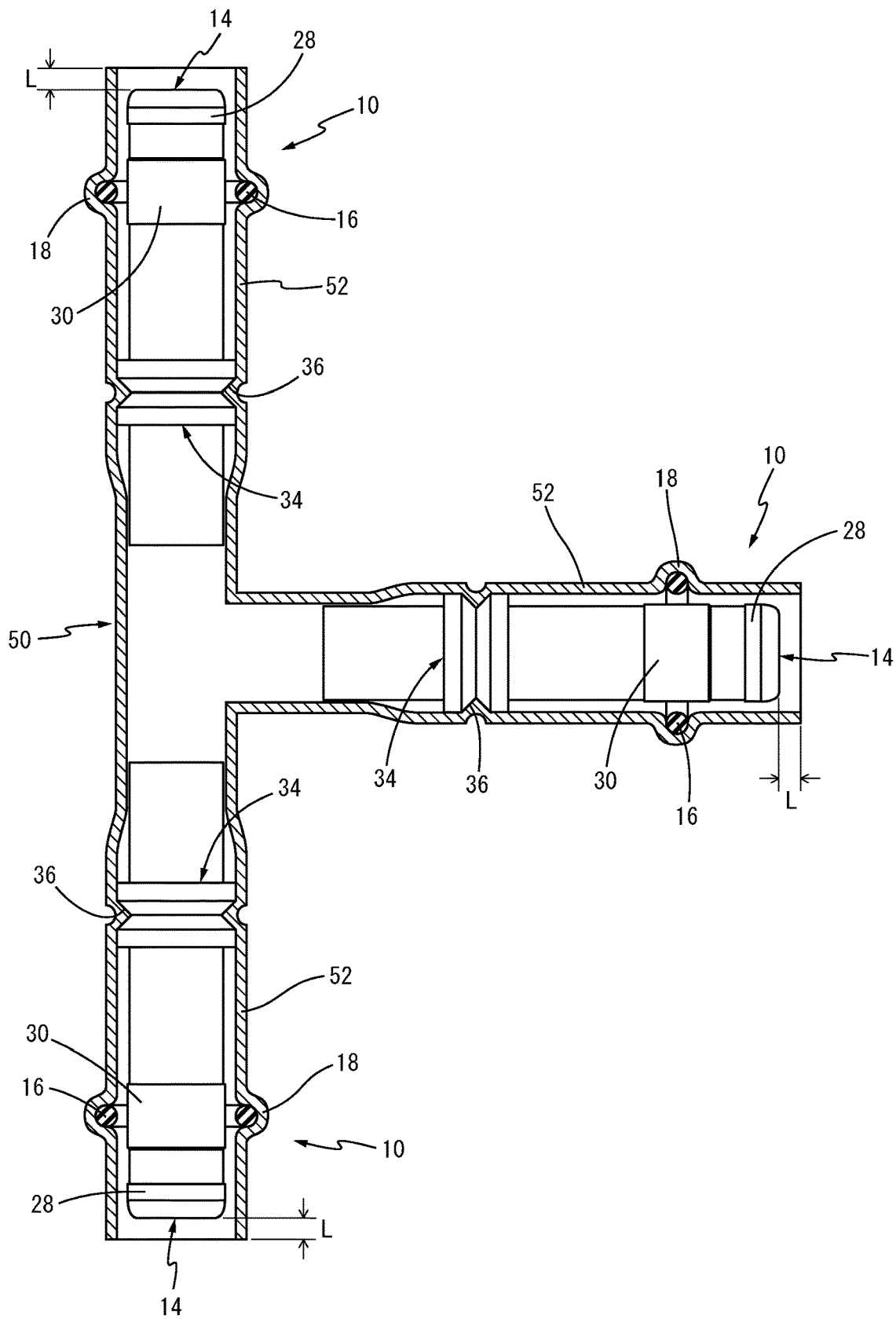
Figure 16:
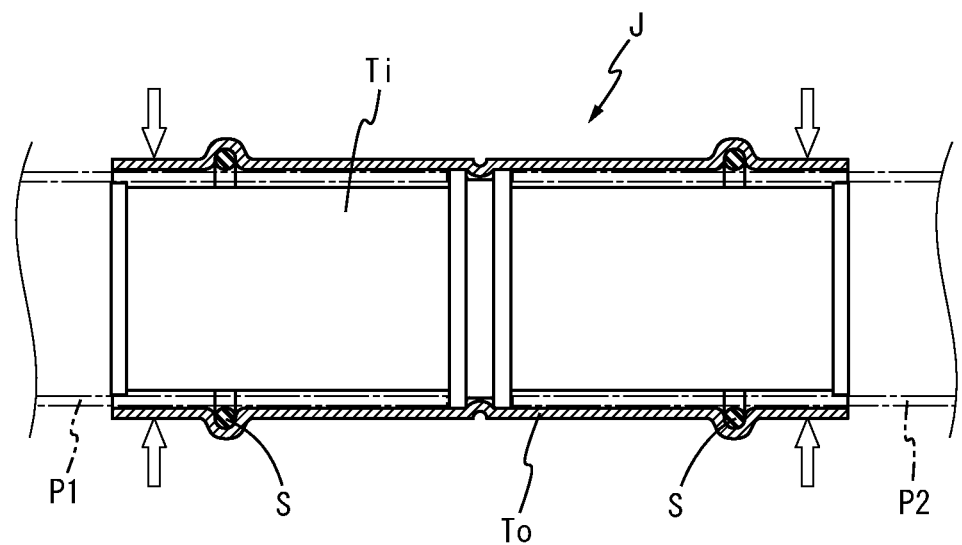
Figure 17:
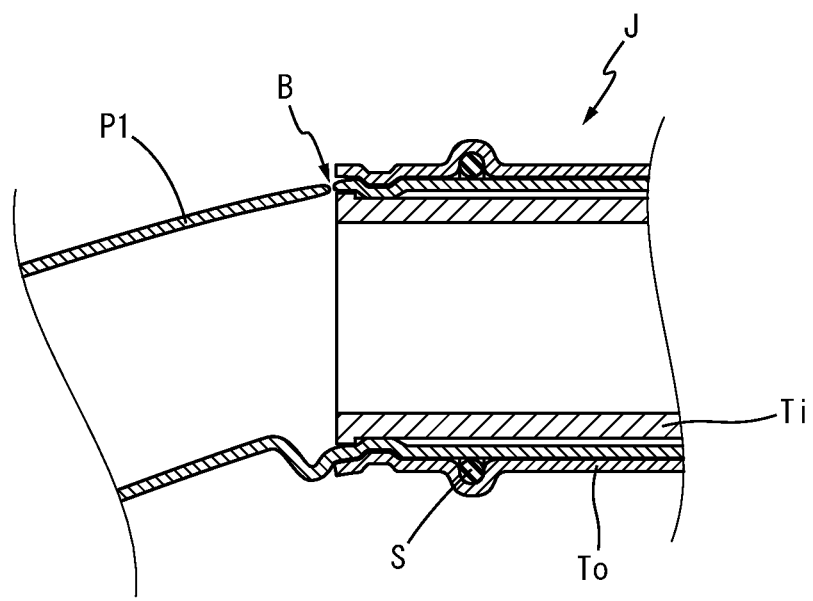

13C is a part of an enlarged explanatory cross sectional view taken along a line G-G in FIG. 13B;

FIGS. 14A and 14B are explanatory views showing another example of the tube fitting according to the invention, wherein FIG. 14A is its explanatory cross sectional view corresponding to FIG. 1A, and FIG. 14B is its explanatory cross sectional view corresponding to FIG. 11;

FIG. 15 is an explanatory cross sectional view showing still another example of the tube fitting according to the invention, which corresponds to FIG. 1A;

FIG. 16 is an explanatory cross sectional view showing one example of a tube fitting having a double-pipe structure consisting of the outer pipe and the inner pipe; and FIG. 17 is an explanatory cross sectional view showing a state where the tube fitting structure shown in FIG. 16 is subjected to bending deformation, resulting in occurrence of fracture in the tube member.

DETAILED DESCRIPTION OF THE INVENTION

To clarify the present invention more specifically, modes for carrying out the invention will be described by reference to the drawings.

Figure 1B:
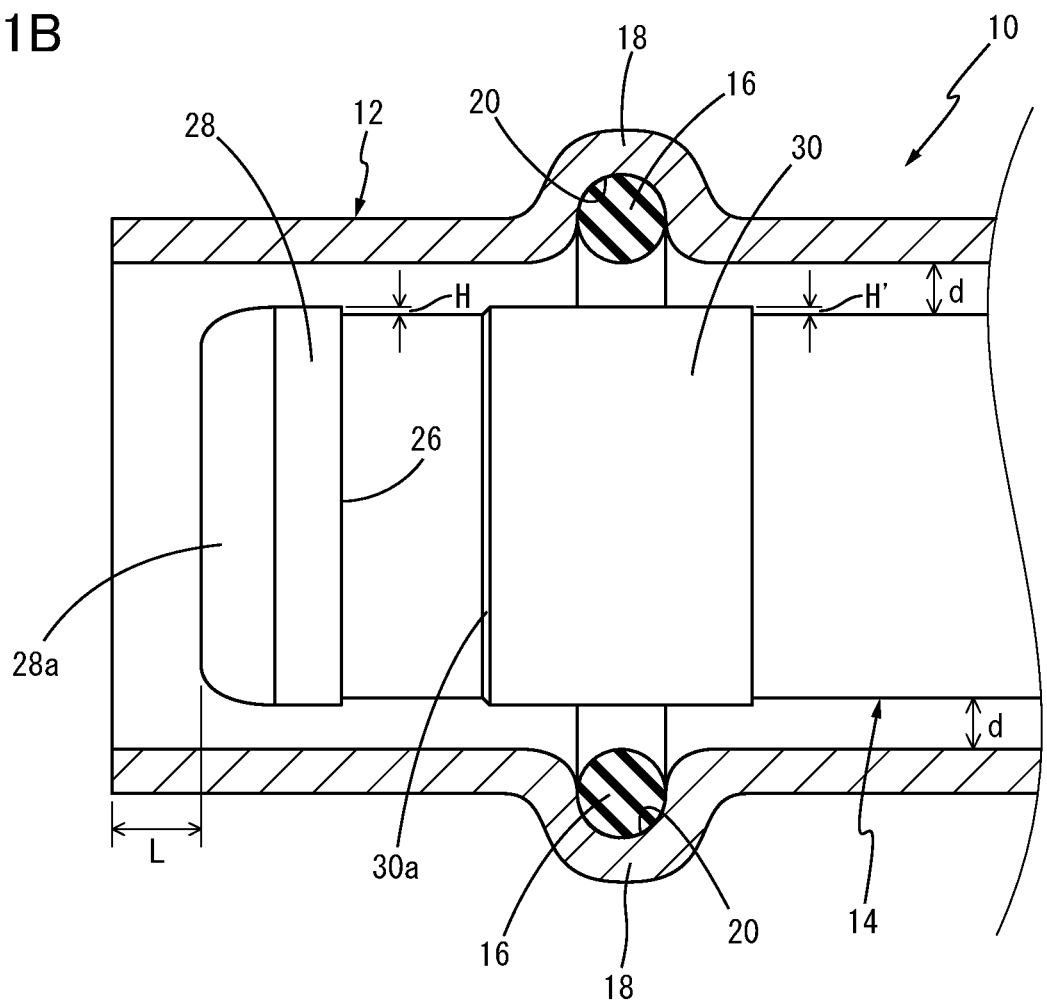

Referring first to FIGS. 1A and 1B, there is shown one example of a tube fitting according to the present invention. FIG. 1A presents a front view of the tube fitting, in which an outer pipe constituting the tube fitting is shown in its axial cross section, and FIG. 1B shows an enlarged view of an end portion of the outer pipe in FIG. 1A. In the example, a tube fitting 10 comprises an outer pipe 12, an inner pipe 14 shorter than the outer pipe 12 with respect to a length in the axial direction, and an O-ring 16 as a sealing means retained by the outer pipe 12.

Figure 2A:
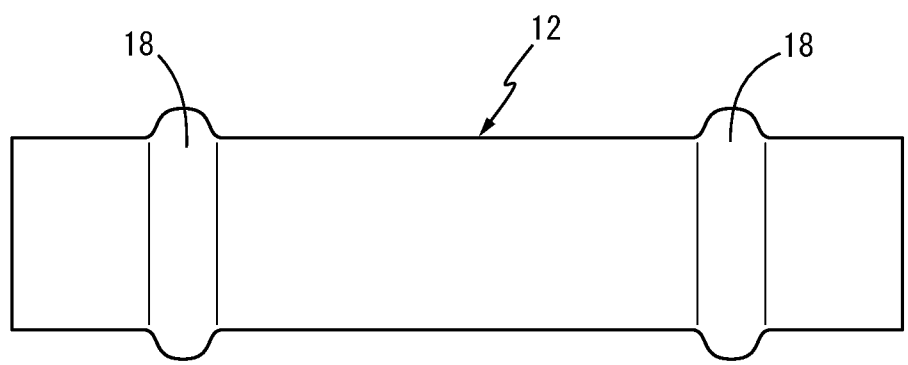
Figure 2B:
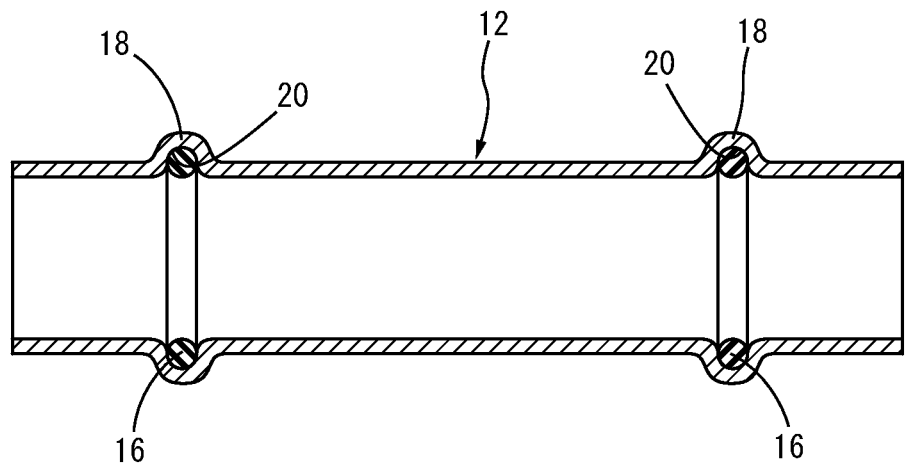

More specifically described, the outer pipe 12 constituting the tube fitting 10 is formed of a metal pipe with a given length as shown in FIGS. 2A and 2B. A wall of the outer pipe 12 is semicircularly deformed to protrude outwardly in its radial direction at opposite end parts positioned farther toward the central portion than the respective opposite ends of the outer pipe 12 by a given length, such that protrusions 18, 18 are formed so as to extend continuously in a circumferential direction of the outer pipe 12. The protrusions 18, 18 are allowed to open to an inside of the outer pipe 12, to thereby form accommodating concaves 20, 20 opening to the inside of the outer pipe 12 and continuously extending in the circumferential direction. In the accommodating concaves 20, 20, respective known O-rings 16, 16 formed of an elastic material such as rubber are accommodated and retained. It is noted that a material of the outer pipe 12 is suitably selected depending on a material of a tube member to be joined described later. For example, in the case where the tube member is a copper pipe well known as a refrigerant piping, which is formed of copper or a copper alloy, the copper or the copper alloy is also selected as the material of the outer pipe 12.

Figure 3A:
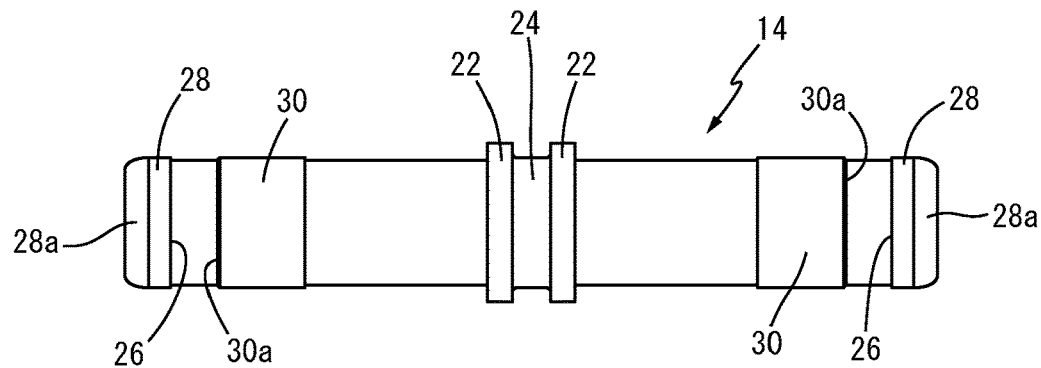
Figure 3B:
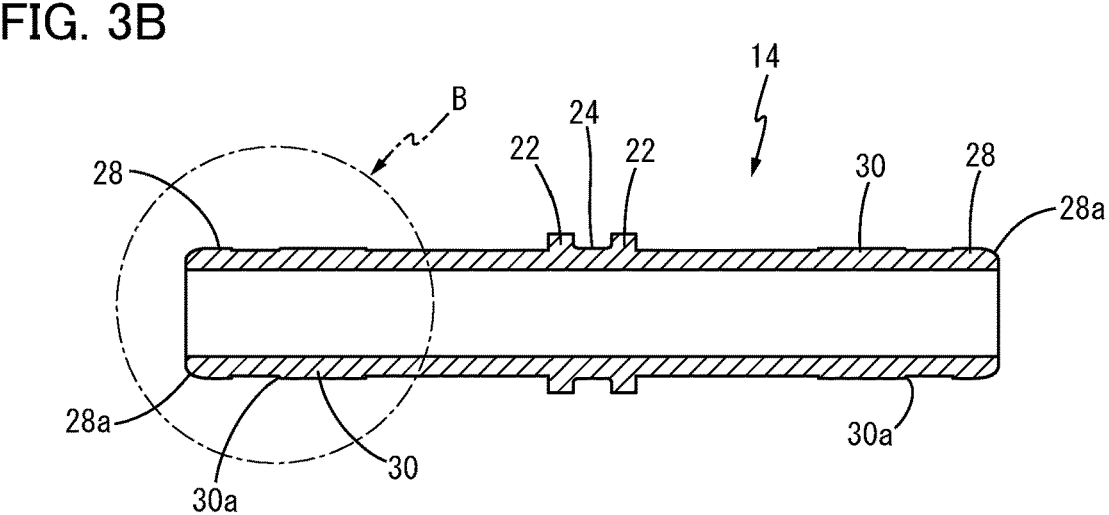

The inner pipe 14 is formed of a metal pipe configured to be shorter than the outer pipe 12 at each of its axial opposite ends by a given length: L, as is apparent from FIG. 1A. As shown in FIGS. 3A and 3B, on an outer circumferential surface of the inner pipe 14, two ring-shaped projections 22, 22 with a given height are integrally formed at a predetermined interval, so as to be positioned in a central portion of the inner pipe 14. The two ring-shaped projections 22, 22 form a space therebetween, so as to give a joining concave 24.

Meanwhile, each of the opposite axial ends of the inner pipe 14 is located axially inward than the corresponding end of the outer pipe 12. In other words, the outer pipe 12 extends outwardly further than each of the opposite axial ends of the inner pipe 14. The opposite end portions of the inner pipe 14 are configured to have a diameter larger than the outer diameter of the central portion of the inner pipe 14 by a height H, and first caulking engagement portions 28, 28 each formed of a stepped part, whose stepped surface is given by its side surface 26 positioned toward the central portion of the inner pipe 14, are arranged on each of the opposite end portions. Each of the first caulking engagement portions 28, 28 has a guiding surface 28a consisting of an outwardly protruding curved surface formed on an end portion (side surface) of the inner pipe 14, as is apparent from FIG. 3C, thereby permitting easy insertion of the tube member. Furthermore, a portion with a given length in the axial direction of the inner pipe 14, which includes a part of the inner pipe 14 corresponding to the accommodating concave 20 for the O-ring 16 in the outer pipe 12, is configured to have a diameter larger than the outer diameter of the central portion of the inner pipe 14, and a second caulking engagement portion 30 having a stepped shape is arranged with a given height: H', here, with the same height as that of the first caulking engagement portion 28. Also a side surface of the second caulking engagement portion 30 on the end side of the inner pipe 14 gives a guiding surface 30a consisting of a tapered surface or an inclined surface, so as to guide the end portion of the tube member to be inserted, thereby permitting a smooth insertion of the tube member into the inner pipe 14.

In the invention, as described above, the outer pipe 12 extends further than the end of the inner pipe 14 with a given length: L. The length: L (mm) of extension and the outer diameter: D (mm) of the tube member (32) satisfy the following formula: L≥0.4×D−6.25, whereby the tube fitting having an effective resistance to the bending fracture is provided. In particular, in the invention, the outer diameter (D) of the tube member (32) is preferably set to be not less than 19 mm for achieving the purpose of the invention further advantageously. The upper limit of the length: L of extension of the outer pipe 12 is suitably determined depending on the outer diameter (D) of the tube member (32). However, it is generally set to be not more than 20 mm, and preferably not more than 10 mm, in view of workability of insertion of the tube member (32) described later, and economics of the tube material, for example.

Figure 3C:
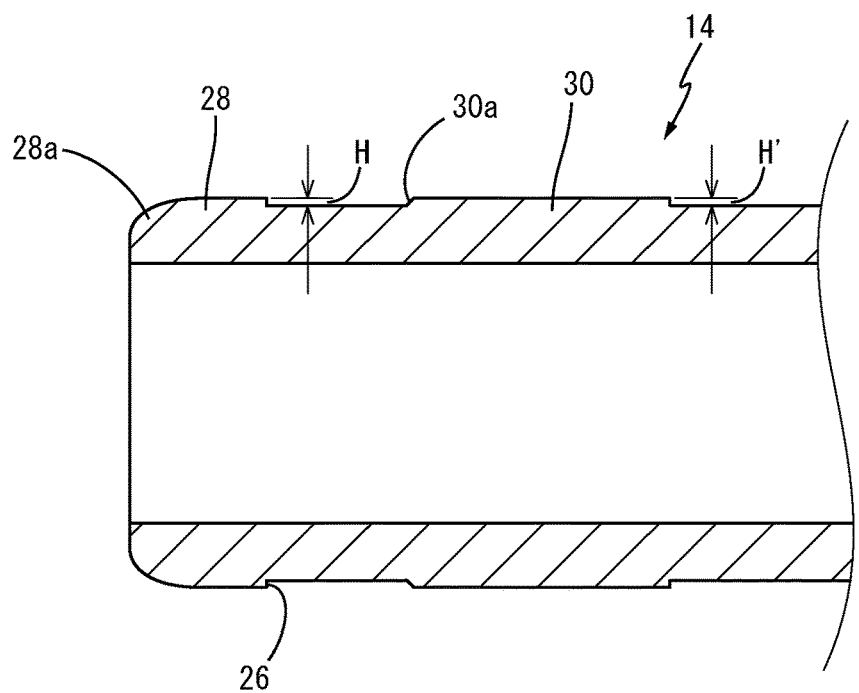

As described above, the inner pipe 14 accepts insertion of a tube member to be joined, that is, the tube member, from the end of the inner pipe 14 to its outer circumferential part. Thus, the outer diameters of the first caulking engagement portion 28 and the like have to be larger than the outer diameter of the inner pipe 14 but smaller than the inner diameter of the tube member. That is, the first caulking engagement portion 28 and the like are arranged in a space: d (see FIG. 1B) formed between the inner surface of the outer pipe 12 and the outer surface of the inner pipe 14, with a predetermined height: H, H' from the outer surface of the inner pipe 14, as shown in FIG. 3C. Furthermore, the two ring-shaped projections 22, 22 integrally formed in the central portion of the inner pipe 14 form the joining concave 24 therebetween, as described above, and are each contacted with one end of two tube members inserted in the respective opposite ends of the inner pipe 14, so as to serve as stoppers to determine the length of insertion of the tube members. The ring-shaped projection 22 is configured such that its height (outer diameter) is smaller than the size of the above-mentioned space: d (or the inner diameter of the outer pipe 12), and the size of a space formed between the ring-shaped projection 22 and the inner surface of the outer pipe 12 is smaller than the thickness of a wall of the tube member.

The inner pipe 14 having the above-mentioned configuration is formed of various known metal material with an excellent corrosion-resistance, depending on the fluid flowing through the tube member. For example, the tube member is preferred to be formed of a brass material in the case where the tube member is for the refrigerant piping. The brass material is formed into the inner pipe 14 preferably by a machining process, in which a bar-shaped brass material is machined to form the inner pipe 14 having a configuration shown in FIGS. 3A, 3B and 3C.

Figure 4:
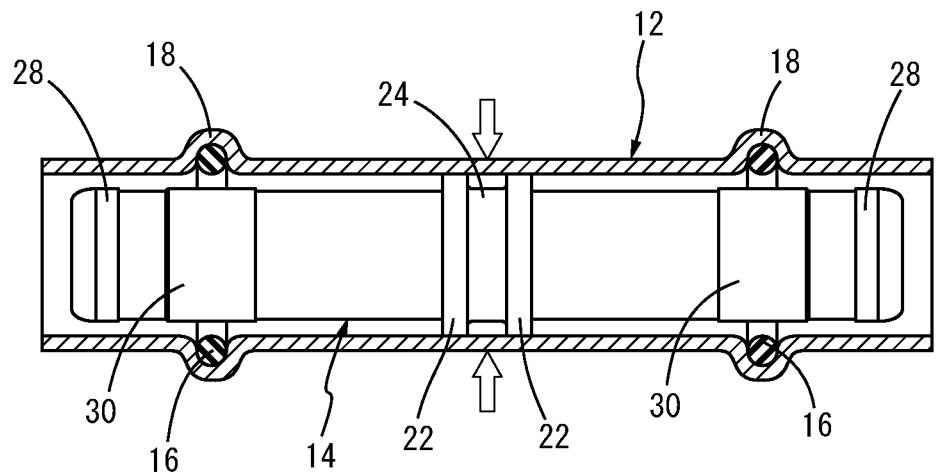
FIG. 4 is an explanatory view showing an assembled state of the inner and outer pipes where the inner pipe shown in FIGS. 3A, 3B and 3C is inserted and positioned in the outer pipe shown in FIGS. 2A and 2B, the outer pipe being shown in its longitudinal sectional view.

The outer pipe 12 and the inner pipe 14 configured as described above are provided and assembled such that the inner pipe 14 is coaxially inserted in the outer pipe 12, and the respective central portions in the axial direction of the outer pipe 12 and the inner pipe 14 substantially coincide, whereby each of the opposite end portions of the outer pipe 12 extends outwardly from the corresponding end of the inner pipe 14. Furthermore, while retaining this configuration, a part of a pipe wall of the outer pipe 12 corresponding to the joining concave 24 formed in the inner pipe 14, that is, the axially central portion of the outer pipe 12 in this case, is caulked by means of pressing force of a jig such as a roller as shown by a blank arrow in FIG. 4, so that the part protrudes inwardly in the radial direction of the outer pipe 12 continuously in its circumferential direction. Thus, the protruded part is fitted into the joining concave 24 to thereby determine the relative position of the outer pipe 12 and the inner pipe 14, and fix the pipes with each other, so that the tube fitting 10 assembled as shown in FIGS. 1A and 1B is completed.

Figure 5:
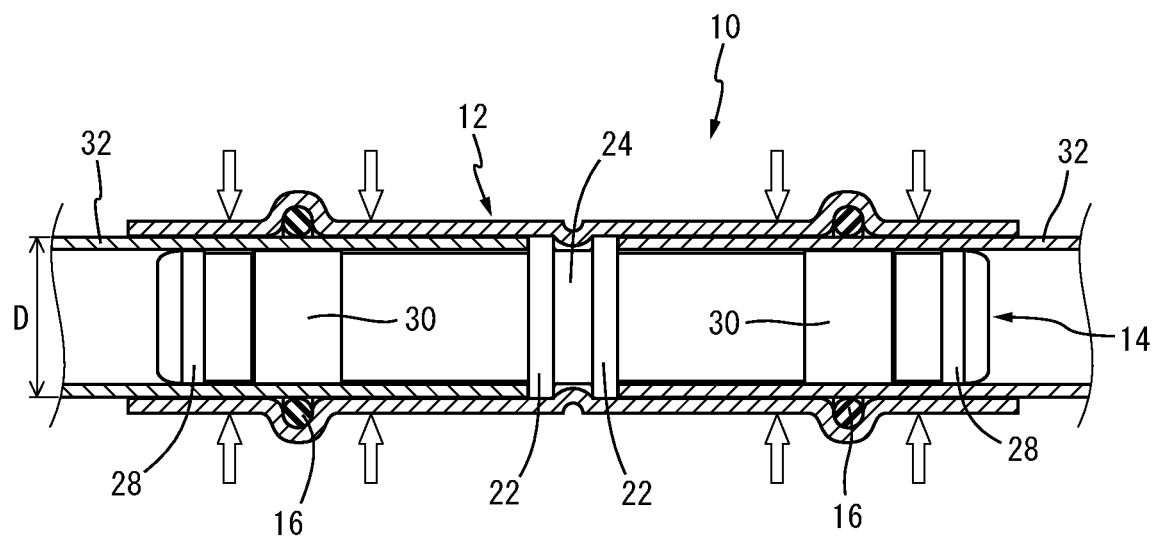
FIG. 5 is an explanatory cross sectional view showing a state where each tube member to be joined is inserted in the tube fitting shown in FIGS. 1A and 1B from each side in an axial direction of the tube fitting.
Figure 6:
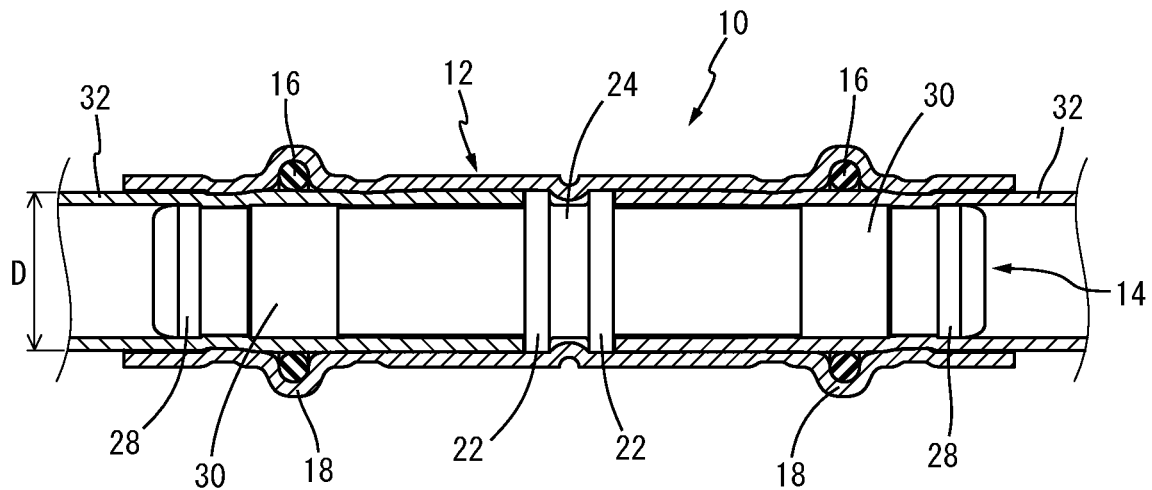
FIG. 6 is an explanatory cross sectional view showing a state where portions positioned toward the opposite ends of the outer pipe are caulked, with the tube members inserted therein as shown in FIG. 5, so that the tube members are joined to the tube fitting.
Figure 7:
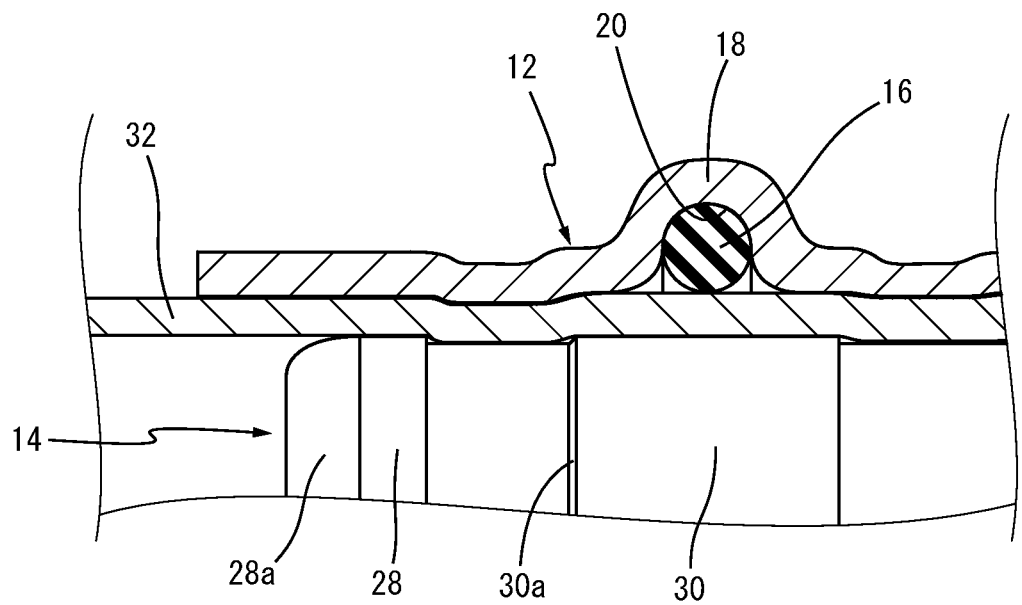
FIG. 7 is a part of an enlarged explanatory view showing a configuration of the caulked part of the outer pipe, the tube member and the inner pipe shown in FIG. 6, at one of the ends of the pipes.

Subsequently, two tube members to be joined having approximately the same outer and inner diameters are connected by means of the tube fitting 10 constituted by assembling the outer pipe 12 and the inner pipe 14. On connecting the tube members, a caulking operation is performed as shown in FIG. 5. That is, as is apparent from FIG. 5, the two tube members 32, 32 are inserted in the space between the outer pipe 12 and the inner pipe 14 at the respective opposite ends of the tube fitting 10, and contacted to the respective side surfaces of the two ring-shaped projections 22 as the stoppers, whereby the tube members are positioned. While the tube members are positioned, parts on both sides of an O-ring 16 retaining portion in the outer pipe 12 are caulked with a known caulking tool at a plurality of positions in the circumferential direction of the outer pipe 12, so that the caulked parts are deformed (reduced in diameter) inwardly in its radial direction, as indicated by a blank arrow in FIG. 5. Thus, at the plurality of positions in the circumferential direction, portions of the tube members 32, 32 positioned below the outer pipe 12 are allowed to bite into the stepped parts of the first caulking engagement portions 28, 28 and the second caulking engagement portions 30, 30 formed at the respective opposite end portions of the inner pipe 14, which stepped parts are positioned toward the central portion of the inner pipe 14, as shown in FIGS. 6 and 7. As such, the tube members 32, 32 and the outer and inner pipes 12, 14 constituting the tube fitting 10 are firmly engaged and fixed.

That is, the caulking operation is performed against parts positioned toward the opposite end portions of the outer pipe 12, at two points in the axial direction and a plurality of points in the circumferential direction, so as to cause deformation (diameter reduction), whereby the portions of the tube members 32, 32 positioned below the caulked parts of the outer pipe 12 are deformed inwardly in their radial direction (in the direction of diameter reduction), so as to be engaged with the stepped parts of the caulking engagement portions 28, 30 of the inner pipe 14. This configuration is shown in FIG. 6, with its enlarged view shown in FIG. 7. With the caulking force applied inwardly in the radial direction of the ends of the outer pipe 12, the tube member 32 remains engaged with the stepped portions of the caulking engagement portions 28, 30 at the respective opposite end portions of the inner pipe 14, thereby giving the tube member 32 a remarkable resistance to the pull-out force. In addition, as a result of the above, the tube member 32 is successfully prevented from being pulled out even when subjected to the flow of fluid under high pressure in its inside.

The outer pipe 12 is caulked by the conventional caulking method of a pipe. That is, as disclosed in JPH11-141760A and JP2003-524132A, the caulking operation is easily performed by pressing the pipe wall inwardly in the radial direction at a plurality of points (for example, four or six points) in the circumferential direction of the pipe, whereby the pipe is deformed to be reduced in diameter. As a result of the above-mentioned caulking operation, the outer pipe 12 and the tube member 32 are reduced in diameter to have a polygonal cross section.

Meanwhile, although the above-mentioned caulking operation at each side of the O-ring 16 can be performed separately, it is preferred that the caulking operations of two portions of the outer pipe 12 located at the respective opposite sides of the O-ring 16 are simultaneously performed, by using a known caulking tool for fastening a plurality of parts in a circumferential direction of the outer pipe 12, at two parts (positions) of the outer pipe 12 spaced apart from each other with a predetermined interval in its axial direction. In particular, in the case where the two parts in each side of the O-ring 16 are simultaneously caulked, and also the protrusion 18 in the outer pipe 12 which gives the accommodating concave 20 for retaining the O-ring 16 is caulked at the same time, the protrusion 18 is pressed in the direction of diameter reduction to be deformed. As a result, the O-ring 16 is firmly pressed against the outer circumferential surface of the tube member 32 to enjoy a more advantageous pressing effect, thereby permitting an effectively improved sealing property between the O-ring 16 and the tube member 32.

In summary, the tube member 32 inserted in one of the ends of the tube fitting 10 is caulked on each side of the O-ring 16. That is, with respect to the first caulking engagement portion 28 formed on the end of the inner pipe 14, the outer pipe 12 is caulked at its end portion, at the plurality of parts in its circumferential direction. In contrast, with respect to the second caulking engagement portion 30 formed to be positioned toward the central portion of the inner pipe 14, the outer pipe 12 is caulked at a position in a relatively central portion than the second caulking engagement portion 30, at the plurality of parts in the circumferential direction. As such, fixing by caulking between the tube member 32 and the outer and inner pipes 12, 14 is effectively achieved, whereby the resistance of the tube member 32 against the pull-out from the tube fitting 10 is further improved. Thus, the pull-out of the tube member 32 from the tube fitting 10 is successfully prevented, thereby advantageously adapting to increase of the diameter of the tube member 32.

To achieve the effective engagement of the tube member 32 with the caulking engagement portions 28, 30 and increase their engagement strength, the outer diameters of the caulking engagement portions 28, 30, more specifically, the heights H, H' indicated in FIG. 3C are generally set to be about 0.1-0.8 mm, and particularly preferably about 0.2-0.7 mm.

By suitably determining parameters such as the heights H, H' in the radial direction of the caulking engagement portions 28, 30 as described above, 5000 N-25000 N or more of pull-out preventing force (resistance to pull-out) can be effectively enjoyed. Thus, the above-mentioned tube fitting 10 can be advantageously used as a tube fitting for the tube member 32 subjected to the flow of fluid under a pressure of higher than 4 MPa, or even, not lower than 18 MPa. In particular, the tube fitting 10 can be used for a fitting for the refrigerant piping in an air conditioner.

Besides, the above-mentioned tube fitting 10 used for joining the tube member 32 is simply composed of the outer pipe 12, the inner pipe 14 and the O-ring 16, that is, the minimum number of components as possible, so that the tube fitting 10 has a simple structure and can be easily assembled. Also on joining the tube member 32, the tube fitting 10 only requires insertion of the end of the tube member 32 and caulking of the end of the outer pipe 12, thereby permitting an advantage that the joining operation of the tube member 32 is also easily performed.

Figure 8:
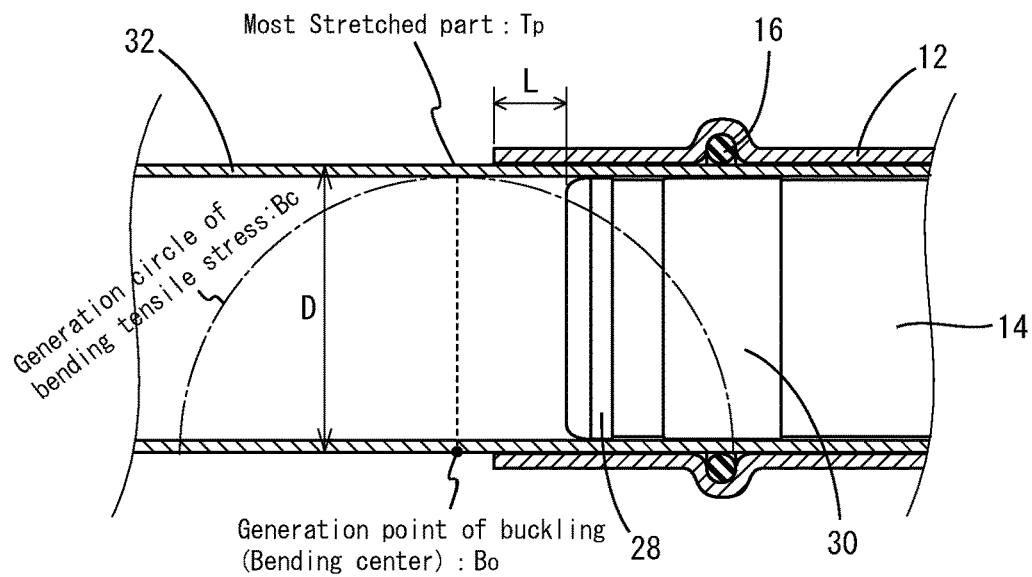
FIG. 8 is an explanatory cross sectional view in a part, which explains bending deformation observed in a bending test performed in a state where the tube member is inserted in a space between the outer pipe and the inner pipe constituting the tube fitting.

Furthermore, the outer pipe 12 extends outwardly in its axial direction from the end of the inner pipe 14 with a given length: L. Due to this configuration, when a bending load is generated, the bending center: Bo which becomes a generation point of buckling of the tube member 32 is permitted to be positioned in proximity of the end of the outer pipe 12 as shown in FIG. 8, whereby a corner portion of the end of the inner pipe 14 which is the singular point is transferred away from the generation circle: Bc of bending tensile stress, whose center is the bending center: Bo. As a result, the tensile stress is not likely to act on the corner portion, so that bending fracture of the tube member 32 at its most stretched part: Tp corresponding to the bending center: Bo is successfully prevented.

Figure 9:
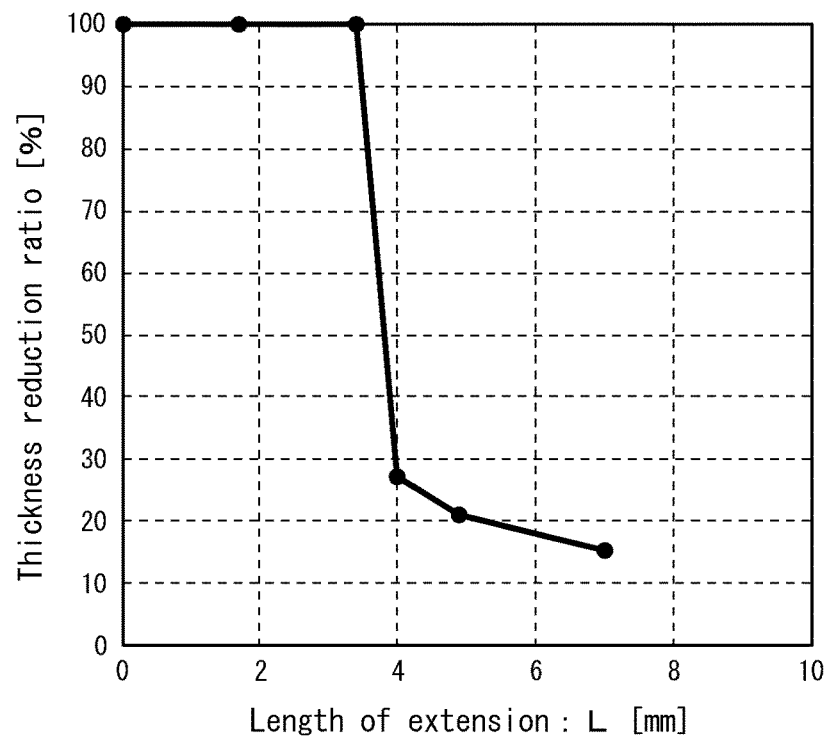
FIG. 9 is a graph showing values of a thickness reduction ratio (%) of the tube member at the most stretched part, and a length of extension (mm) of the outer pipe, the values being obtained in a bending test performed in a state where the tube member is inserted in tube fittings including various outer pipes with different lengths of extension.
Figure 10A:
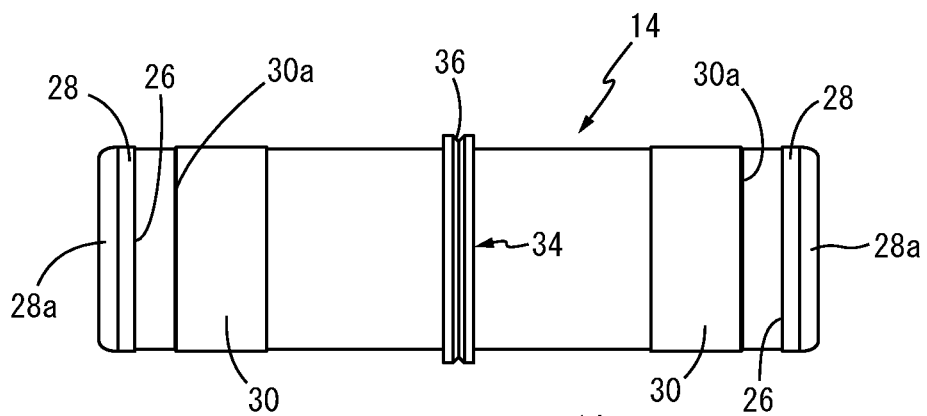
FIGS. 10A, 10B, 10C and 10D are explanatory views showing another example of the inner pipe used for the tube fitting according to the invention (corresponding to FIGS. 3A, 3B and 3C), wherein FIGS. 10A and 10B correspond to FIGS. 3A and 3B respectively.
Figure 10B:
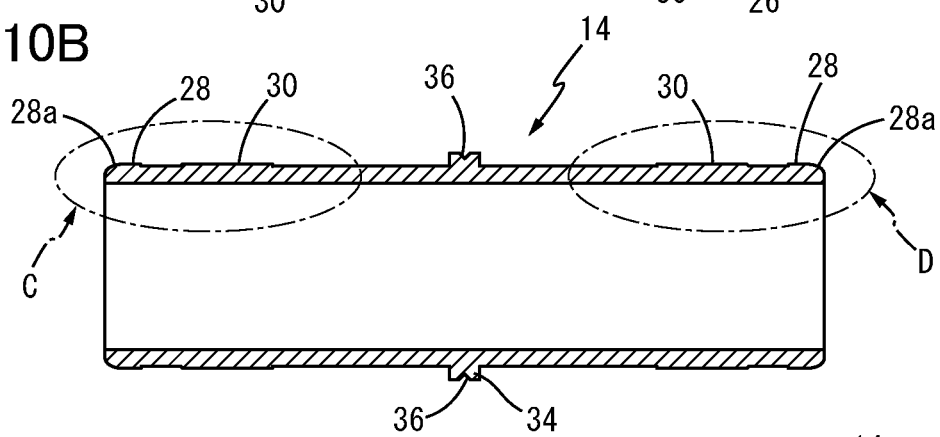
Figure 10C:
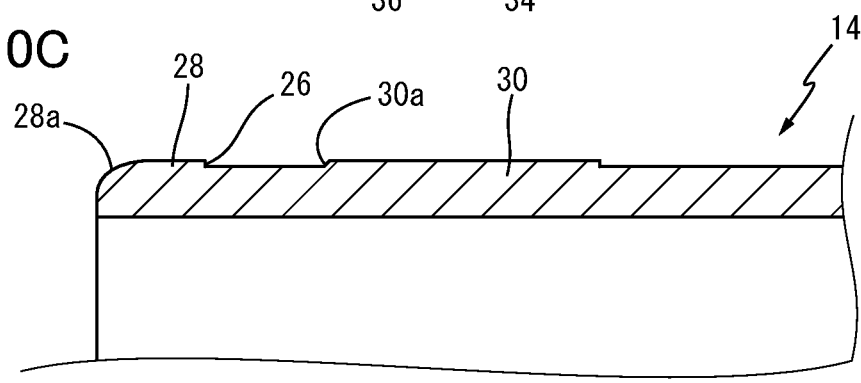
Figure 10D:
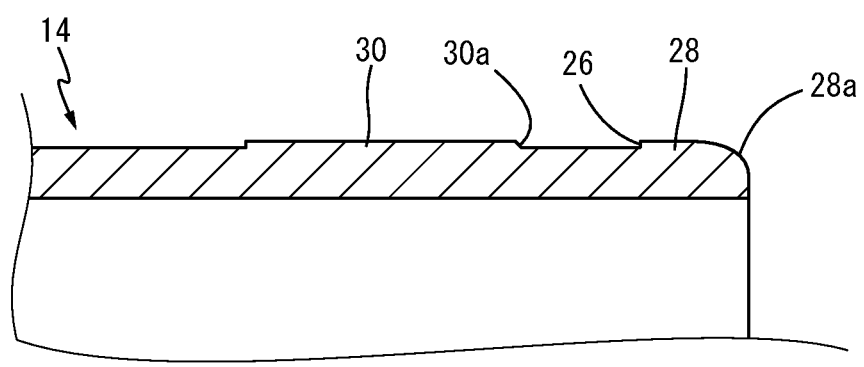

In fact, in FIG. 9, the results of bending tests of the tube member 32 in the tube fitting 10 including the outer pipe 12 with various lengths: L of extension are shown in terms of a thickness reduction ratio (%) at the above-mentioned most stretched part: Tp of the tube member 32. In the bending tests, a high strength copper tube (outer diameter: 25.4 mm, tube thickness: 1 mm) used as the refrigerant piping was provided as the tube member 32, and the high strength copper tube was bent to an angle of 15°. It is indicated that the bending fracture is caused, thereby meaning that the thickness reduction ratio is 100%, in the case where the length: L of extension is small. In contrast, in the case where the length: L of extension is larger than a given value, that is, where the value is not smaller than (0.4×D−6.25) wherein the outer diameter of the tube member 32 is defined as D (mm), it can be read that the thickness reduction ratio is small and the bending fracture is not likely to occur. It is noted that the tube member 32 used here practically has the outer diameter (D) of 40 mm at the maximum.

The larger the above-mentioned diameter of the tube member 32, the larger the pull-out effect to which the tube member 32 is subjected due to the pressure of the fluid flowing through its inside. Thus, the tube member 32 and the outer and inner pipes 12, 14 are preferred to be more firmly fixed in the tube fitting according to the invention when the tube member 32 has an increased diameter. In the case where the tube fitting is provided for the tube member 32 which has a diameter of 25.40 mm or 28.58 mm, and is usually used as the refrigerant piping and the like, the following structure is advantageously employed as shown in the figures. That is, the second caulking engagement portion 30 is integrally formed on an outer circumferential surface of the inner pipe 14 positioned on the other side of the formation of the first caulking engagement portion 28 across the O-ring 16, so as to be formed of a projection streak having a diameter larger than the outer diameter of the inner pipe 14. Then, a part of the outer pipe 12 positioned in the relatively central portion than the second caulking engagement portion 30 is caulked, so that a part of the tube member 32 positioned below the part of the outer pipe 12 is deformed to be engaged with the second caulking engagement portion 30.

In the above-mentioned example of the tube fitting 10, two ring-shaped projections 22, 22 serving as the stoppers are formed on the outer periphery of the axially central portion of the inner pipe 14, at a predetermined interval. However, instead, it is possible to use the inner pipe 14 having a structure in which a single ring-shaped projection 34 with a given width is formed in the axially central portion of the inner pipe 14, and the ring-shaped projection 34 has a joining concave 36 in the shape of a V-like groove formed on a top surface of the ring-shaped projection 34 along the entirety of its circumference, as shown in FIGS. 10A, 10B, 10C and 10D.

When using the inner pipe 14 with the single ring-shaped projection 34 formed thereon to constitute the tube fitting 10 by assembling the inner pipe 14 to the outer pipe 12 as shown in FIGS. 2A and 2B, the intended tube fitting 10 is composed as follows. As in the case of the above-mentioned embodiment, the inner pipe 14 is inserted in the outer pipe 12 such that the outer pipe 12 extends from the opposite ends of the inner pipe 14 with the predetermined length (L), and while retaining that state, the axially central portion of the outer pipe 12 is pressed to protrude inwardly in its radial direction. Then, the protruded part is fitted into the joining concave 36 in the shape of a V-like groove, whereby the outer pipe 12 and the inner pipe 14 are integrally joined with each other to form the intended tube fitting 10. On connecting the tube members 32 by means of the composed tube fitting 10, the caulking operation is performed as in the case of the above-mentioned embodiment while the ends of the tube members 32 are contacted to the respective opposite side surfaces of the ring-shaped projection 34. Thus, as shown in FIG. 11, the tube members 32 and the outer and inner pipes 12, 14 are joined by caulking to complete the joining of the tube members 32 to the tube fitting 10.

Meanwhile, when the tube members 32 are contacted and assembled at their ends with the respective side surfaces of the ring-shaped projections 22, 34 of the inner pipe 14 as described above, a metal seal may be formed between the tube members 32 and the side surfaces of the ring-shaped projections 22, 34, resulting in prevention of the leakage of fluid such as the refrigerant without a fastening operation by caulking accompanied by fastening of the O-ring 16. If the joining operation between the tube fitting 10 and the tube members 32 is finished without the fastening operation due to the above situation, the leakage of fluid such as the refrigerant may occur afterward due to vibration and the like to cause a serious problem.

In particular, a vertical piping for an air conditioner used in a building, which is arranged mainly in a duct, has a structure in which tube members are connected or joined in the vertical direction by means of several tube fittings. In this piping structure, the lower a tube fitting is positioned, the bigger the weights of the tube members and the tube fittings which are applied to the tube fitting. Consequently, the tube fitting positioned in the lowest portion of the piping structure is subjected to the entire weight of the tube members and the tube fittings, and an unintended metal seal is likely to be formed between a stopper usually arranged in such a tube fitting and the end surface of the tube member. As such, the above-mentioned piping has an inherent problem of the leakage of fluid such as the refrigerant after its construction in the case where the fastening operation of the tube fittings is not properly performed at the time of the construction.

Figure 12A:
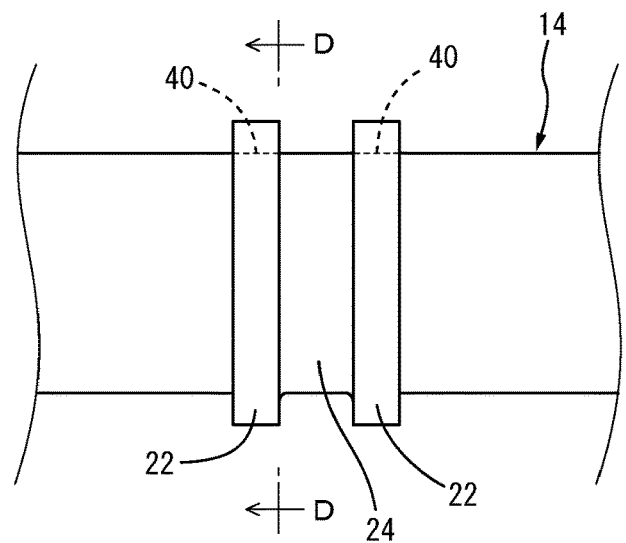
Figure 12B:
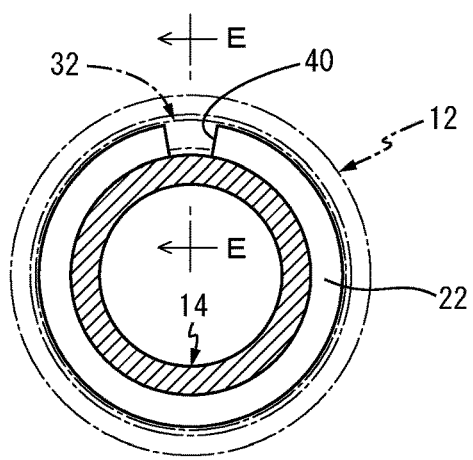
Figure 12C:
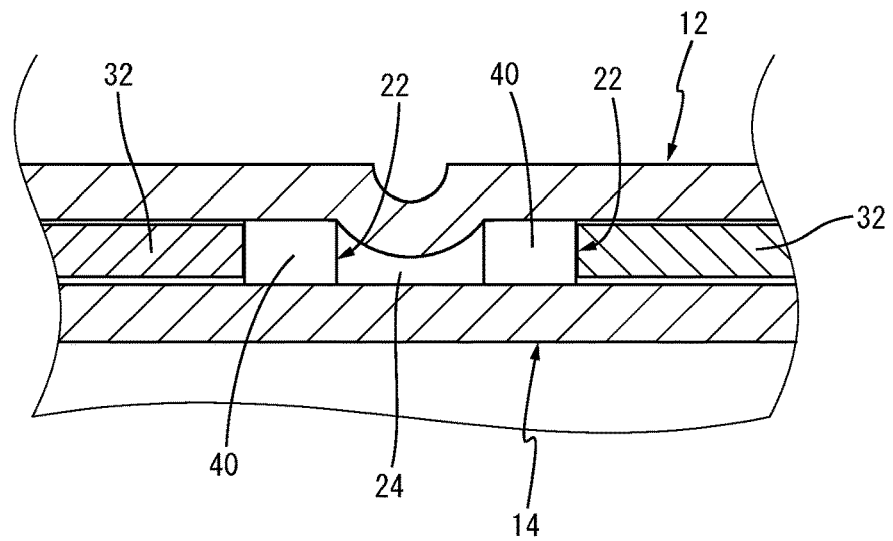
Figure 13C:
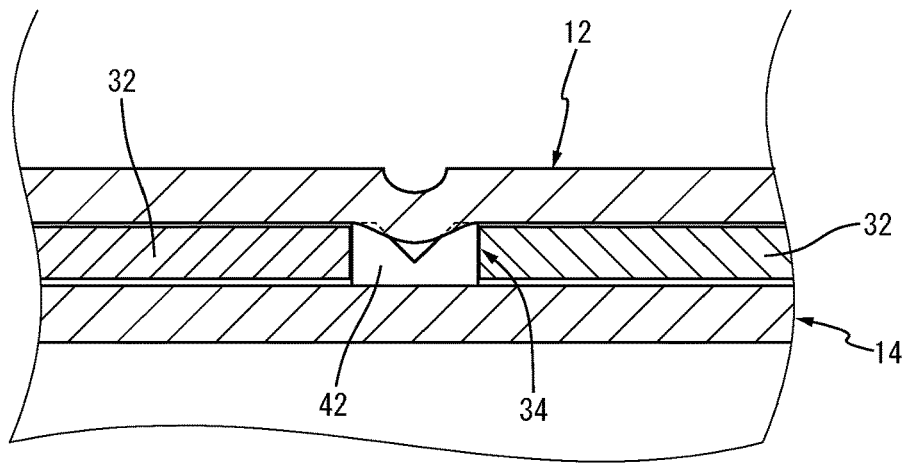

Under the above-mentioned circumstances, in the invention, the ring-shaped projections 22, 34 integrally formed on the outer circumferential surface of the inner pipe 14 as the stoppers are advantageously configured to have cutouts 40, 42 crossing the ring-shaped projections 22, 34 respectively, as shown in FIGS. 12A, 12B and 12C and FIGS. 13A, 13B and 13C. The cutouts 40, 42 permit communication between an inside space and an outside space of the tube member 32, in other words, communication between a clearance formed between the tube member 32 and the inner pipe 14, and a clearance formed between the tube member 32 and the outer pipe 12, as shown in FIG. 12C and FIG. 13C. With such a configuration, even if the fastening operation of the tube fittings is not properly performed at the time of the construction, the leakage of the refrigerant from the tube fittings is certainly detected in a leakage test before a trial run after the construction, so that a failure of the construction can be detected and effectively handled.

In the example shown in FIGS. 12A, 12B and 12C, the cutout 40 is integrally formed at a single point on the ring-shaped projection 22, and in the example shown in FIGS. 13A, 13B and 13C, the cutouts 42 are formed in two diagonal points on the ring-shaped projection 34. Although the number of the cutouts 40, 42 is suitably determined, the cutout only in a single point may not be able to permit the above-mentioned communication due to a bias of the tube member in the tube fitting, and it is preferred to form the cutouts in not less than two points. It is completely acceptable to form the cutouts in three or more points. Also the position of the formation of the cutouts is suitably selected depending on an arrangement of the piping and the tube fitting.

Although one typical embodiment of the invention has been described in detail for illustration purpose only, it is to be understood that the invention is not limited to the details of the preceding embodiment.

For example, although the explanation of the above-mentioned embodiment is based on the tube fitting for lineally connecting the tube members 32, 32 with each other, the invention is by no means limited to such a configuration. The tube fitting of the invention can be advantageously used as any of the conventionally known tube fittings with various names (for example, socket, adapter, tees, T-shaped, Y-shaped, cross-shaped, 90° elbow and the like), which are used for connecting a piping transferring fluid such as a liquid and a gas to another piping, or to an intended apparatus. Depending on the kind of such tube fittings, or optionally, the caulking engagement portions 28, 30 can be formed on only one of the end portions of the inner pipe 14 to perform the caulking engagement according to the invention.

It is recommended to use a caulking tool disclosed in JP2003-521432A for caulking the outer pipe 12. By using such a tool, caulking is performed against parts of the outer pipe 12 positioned on each side of the O-ring 16, that is, two parts of the outer pipe 12, and against the protruded portion accommodating the O-ring 16 simultaneously, so that the protruded portion is subjected to the caulking force (diameter reduction force). The O-ring 16 is thus firmly pressed against the outer circumferential surface of the tube member 32, thereby advantageously increasing a sealing property therebetween.

Furthermore, joining of the outer pipe 12 and the inner pipe 14 with each other is just made for improving workability, and is not necessarily required. The joining concave 24 is not necessarily formed between the two ring-shaped projections 22, 22 arranged on the outer circumferential surface of the inner pipe 14, either. As in the case of the embodiments shown in FIGS. 10A, 10B and 10C, and FIG. 11, the two ring-shaped projections 22, 22 can be replaced with the single ring-shaped projection 34 which has a circumferential groove with a U-shaped or V-shaped cross section, for example, on its outer circumferential surface (top surface), such that the circumferential groove constitutes the joining concave 36. In addition, the pipe wall of the outer pipe 12 can be fitted into the joining concaves 24, 36 not only continuously in its circumferential direction as shown in the example, but also intermittently in its circumferential direction.

Also the caulking engagement portions 28, 30 and the guiding surfaces 28a, 30a in the caulking engagement portions 28, 30 are not limited to the embodiment in the example, and can be a curved convex surface (arc surface) protruding outwardly, or a tapered or inclined surface. Additionally, the formation of the guiding surfaces 28a, 30a is not essential, either.

As the sealing means arranged between the outer pipe 12 and the inner pipe 14, the O-ring 16 as shown in the example is used in general. However, it is also possible to use various known sealing members and sealing mechanism in place of the O-ring 16. The sealing means is thus suitably selected from them to effectively achieve the seal between the tube member 32 to be inserted and the outer pipe 12 or the inner pipe 14. The sealing means such as the O-ring 16 is preferably arranged on the outer pipe 12, but it is also acceptable to arrange the O-ring 16 on the inner pipe 14.

In the embodiment shown in the example, the stoppers are given by the side surfaces of the ring-shaped projections 22, 34 for the joining concave arranged in the inner pipe 14, whereby the joining concave and the stoppers are simultaneously formed. However, the stopper can be omitted, and can be formed in the inner surface of the outer pipe 12, too.

Furthermore, in the invention, when the corresponding ends of the two tube members 32, 32 are connected as shown in FIGS. 6 and 11, the end portion of one of the tube members 32 having a given length can be used as the outer pipe 12 in the tube fitting 10, so that the tube fitting structure according to the invention is configured at the end portion of the one of the tube members 32. More specifically described, the tube fitting 10 utilizing the end portion of the tube member 32 as the outer pipe (12) is configured as shown in FIG. 14A. That is, the inner pipe 14 having a configuration corresponding to the left half of the structure shown in FIGS. 10A and 10B, which includes the part stretching from the caulking engagement portion 28 to the ring-shaped projection 34, is inserted in the end of the one of the tube members 32, such that the end portion of the inner pipe 14 enters into the end portion of the tube member 32 with a given length: L. Then, the tube member 32 is pressed to protrude into the joining concave 36 in the shape of a V-like groove, which is formed on the top surface of the ring-shaped projection 34, whereby the tube member 32 and the inner pipe 14 are integrally joined with each other to form the tube fitting 10. The arrangement of the O-ring 16 and the configuration of the inner pipe 14 (the left half of the structure shown in FIGS. 14A and 14B) are the same as in the case of the previously mentioned example. Thus, the same reference numbers are allotted to the corresponding components, and the detailed explanation is omitted.

When one of the tube members 32 utilized as the outer pipe and the other of the tube members 32 are connected with each other by means of the tube fitting 10 configured as shown in FIG. 14A, the end portion of the other of the tube member 32 is inserted from the left side in the figure and thereafter the caulking operation is performed as in the case of FIG. 11 to fixedly engage the tube members 32 with each other. Thus, the connecting structure of the two tube members 32, 32 as shown in FIG. 14B is completed.

In the case where the invention is applied to a non-linear fitting structure such as an elbow, a T-shaped, a Y-shaped, a cross-shaped and a U-shaped (bent-type), a predetermined inner pipe as in the case of FIGS. 14A and 14B is inserted and arranged in an opening in a pipe portion of each of the fittings, the pipe portion being utilized as an outer pipe, to thereby form the fitting structure according to the invention. More specifically described, in the case of a T-shaped tube fitting shown in FIG. 15 for example, inner pipes 14 as shown in FIG. 14A are individually and independently inserted and arranged in three openings 52 each positioned at the respective end portions of a T-shaped pipe 50. Each of the openings 52 at the corresponding end portion is utilized as the outer pipe to form three of the tube fitting structures according to the invention. The tube members 32 are inserted in each of the three tube fitting structures as in the case of the example and connected with each other, so as to form the T-shaped fitting. Allowing the inner pipes to be individually and independently inserted and arranged in the respective openings 52 at the corresponding end of the pipe 50 permits an advantage that the tube fitting can be advantageously used even when the tube members 32 to be joined have the different outer diameters.

It is to be understood that the present invention may be embodied with various changes, modifications and improvements which may occur to those skilled in the art, without departing from the spirit and scope of this invention, and that such changes, modifications and improvements are also within the scope of this invention.

NOMENCLATURE OF REFERENCE SIGNS

| | |
|---|---|
| 10 Tube fitting | 12 Outer pipe |
| 14 Inner pipe | 16 O-ring |
| 18 Protrusion | 20 Accommodating concave |
| 22, 34 Ring-shaped projection | 24, 36 Joining concave |
| 28 First caulking engagement portion | 28a, 30a Guiding surface |
| 30 Second caulking engagement portion | 32 Tube member |
| 40, 42 Cutout | 50 T-shaped pipe |
| 52 Opening at the end | |

The invention claimed is:

1. A tube fitting comprising:
an outer pipe;
an inner pipe which is coaxially inserted in the outer pipe, and has such an outer diameter that gives a space between an outer surface of the inner pipe and an inner surface of the outer pipe, in which space a tube member to be joined is inserted; and
a sealing means disposed between the outer pipe and the inner pipe, wherein:
the sealing means is configured to seal a clearance between the tube member inserted in the space and the outer pipe or the inner pipe;
the outer pipe, the tube member and the inner pipe are fixedly engaged by pressing;
the outer pipe extends outwardly in its axial direction further than an end of the inner pipe;
a length: L (mm) of extension of the outer pipe from the end of the inner pipe and an outer diameter: D (mm) of the tube member satisfy the following formula: $L \geq 0.4 \times D - 6.25$ (mm); and
the outer diameter D of the tube member is not less than 19 mm.

2. The tube fitting according to claim 1, wherein the inner pipe has a first engagement portion on an outer circumferential part of its end, the first engagement portion having a stepped shape with a larger diameter than that of a central portion of the inner pipe, and
wherein an end of the tube member is inserted in the space between the outer pipe and the inner pipe, and the outer pipe and the tube member are pressed together at a part located axially inside of the first engagement portion, whereby the outer pipe, the tube member and the inner pipe are fixedly engaged.

3. The tube fitting according to claim 2, wherein the first engagement portion formed on the outer circumferential part of the end of the inner pipe has a guiding surface having a curved convex shape or tapered shape.

4. The tube fitting according to claim 1,
wherein an accommodating concave is formed in the outer pipe so as to open to its inside and extend in its circumferential direction, and
wherein an O-ring as the sealing means is fitted and accommodated in the accommodating concave so as to be pressed against an outer surface of the tube member inserted in the outer pipe, thereby permitting a seal between the tube member and the outer pipe.

5. The tube fitting according to claim 4,
wherein a part of the inner pipe corresponding to the accommodating concave for the O-ring in the outer pipe has a larger diameter than that of a central portion of the inner pipe to thereby form a second engagement portion having a stepped shape, and
wherein pressing is performed on each side of the second engagement portion in its axial direction, thereby permitting the seal between the outer pipe and the tube member.

6. The tube fitting according to claim 1, wherein a stopper is formed integrally on the inner surface of the outer pipe or the outer surface of the inner pipe, the stopper being contacted with an end of the tube member so as to determine a length of insertion of the tube member.

7. The tube fitting according to claim 6, wherein the stopper is a ring-shaped projection continuously extending in a circumferential direction of the inner pipe, the ring-shaped projection being integrally formed on an outer circumferential surface of the inner pipe with a height not to contact with an inner circumferential surface of the outer pipe.

8. The tube fitting according to claim 7,
wherein at least one cutout crossing the ring-shaped projection is formed, and
wherein the end of the tube member is contacted with the at least one cutout, so that clearances located inside and outside the tube member are allowed to communicate with each other through the at least one cutout.

9. The tube fitting according to claim 1,
wherein a joining concave is formed on an outer circumferential surface of a central portion of the inner pipe, and
wherein, while the inner pipe is inserted in the outer pipe, a part of a pipe wall of the outer pipe corresponding to the joining concave is deformed to protrude inwardly in a radial direction of the pipe, so that the protruded part is fitted into the joining concave to determine a relative position of the outer pipe and the inner pipe, and fix the outer pipe and the inner pipe together.

10. The tube fitting according to claim 9, wherein the joining concave is constituted by a space between two ring-shaped projections integrally formed on the outer circumferential surface of the inner pipe, the ring-shaped projections serving as stoppers to which an end of the tube member is contacted so as to determine a length of insertion of the tube member.

11. The tube fitting according to claim 9,
wherein a single ring-shaped projection with a given width is integrally formed on the outer circumferential surface of the central portion in the axial direction of the inner pipe, and a groove giving the joining concave is formed on a top surface of the single ring-shaped projection continuously in the circumferential direction of the inner pipe, and
wherein a side surface of the single ring-shaped projection serves as a stopper to which an end of the tube member is contacted so as to determine a length of insertion of the tube member.

12. The tube fitting according to claim 1 disposed in each of the opposite end portions of the outer pipe and the inner pipe, wherein two of the tube members are fixed by pressing at their opposite ends to the respective opposite end portions of the outer pipe and the inner pipe, so that the tube members are connected with each other.

13. A tube fitting structure obtained by connecting two tube members by means of the tube fitting according to claim 12,
wherein the tube fitting is formed by utilizing each of the opposite end portions of the outer pipe and the opposite end portions of the inner pipe, and
wherein pressing is performed while each of the ends of the two tube members is inserted in a circular space formed between each of the opposite end portions of the outer pipe and the inner pipe, whereby each of the two tube members is fixedly engaged to the corresponding opposite end portion of the outer pipe and the inner pipe.

14. The tube fitting according to claim 1 used for connecting two of the tube members, wherein one of the two tube members is utilized as the outer pipe, and the inner pipe is coaxially inserted and positioned in the one of the two tube members.

15. A tube fitting structure obtained by connecting two tube members by means of the tube fitting according to claim 14,
wherein one of the two tube members is utilized as the outer pipe, and the inner pipe is coaxially inserted and positioned in an opening at an end of the one of the tube members to thereby form the tube fitting, and
wherein pressing is performed while an end of the other of the two tube members is inserted in a circular space formed between an opening at the end of the one of the tube members in the tube fitting and the inner pipe, whereby the one of the tube members, the inner pipe and the other of the tube members are fixedly engaged.

16. The tube fitting according to claim 1 used for connecting a plurality of the tube members, wherein the outer pipe has a plurality of openings corresponding to the plurality of the tube members, and the inner pipe is coaxially inserted and positioned in each of the plurality of openings.

17. A tube fitting structure obtained by connecting a plurality of tube members by means of the tube fitting according to claim 16,
wherein the outer pipe has a plurality of openings corresponding to the plurality of tube members, and the inner pipe is coaxially inserted and positioned in each of the plurality of openings to thereby form the tube fitting, and
wherein pressing is performed while an end of each of the plurality of tube members is inserted in a circular space formed between the plurality of openings of the outer pipe and the inner pipe, whereby each of the openings in the outer pipe, the tube members and the inner pipe are fixedly engaged.

18. A tube fitting structure obtained by joining a given tube member by means of the tube fitting according to claim 1, wherein pressing is performed while an end of the tube member is inserted in a circular space formed between the outer pipe and the inner pipe, whereby the outer pipe, the tube member and the inner pipe are fixedly engaged.

19. A tube fitting comprising:
an outer pipe;
an inner pipe which is coaxially inserted in the outer pipe, and has such an outer diameter that gives a space between an outer surface of the inner pipe and an inner surface of the outer pipe, in which space a tube member to be joined is inserted; and
a sealing means disposed between the outer pipe and the inner pipe, wherein:
the sealing means is configured to seal a clearance between the tube member inserted in the space and the outer pipe or the inner pipe;
the outer pipe, the tube member and the inner pipe are fixedly engaged by pressing;
the outer pipe extends outwardly in its axial direction further than an end of the inner pipe;
a length: L (mm) of extension of the outer pipe from the end of the inner pipe and an outer diameter: D (mm) of the tube member satisfy the following formula: L≥0.4× D−6.25 (mm);
a stopper is formed integrally on the outer surface of the inner pipe, the stopper being contacted with an end of the tube member so as to determine a length of insertion of the tube member;
the stopper is a ring-shaped projection continuously extending in a circumferential direction of the inner pipe, the ring-shaped projection being integrally formed on an outer circumferential surface of the inner pipe with a height not to contact with an inner circumferential surface of the outer pipe;
at least one cutout crossing the ring-shaped projection is formed; and
the end of the tube member is contacted with the at least one cutout, so that clearances located inside and outside the tube member are allowed to communicate with each other through the at least one cutout.

20. The tube fitting according to claim 19, wherein:
an accommodating concave is formed in the outer pipe so as to open to its inside and extend in its circumferential direction;

an O-ring as the sealing means is fitted and accommodated in the accommodating concave so as to be pressed against an outer surface of the tube member inserted in the outer pipe, thereby permitting a seal between the tube member and the outer pipe;

a part of the inner pipe corresponding to the accommodating concave for the O-ring in the outer pipe has a larger diameter than that of a central portion of the inner pipe to thereby form a second engagement portion having a stepped shape; and pressing is performed on each side of the second engagement portion in its axial direction, thereby permitting the seal between the outer pipe and the tube member.

21. The tube fitting according to claim 19, wherein a joining concave is formed on an outer circumferential surface of a central portion of the inner pipe, and wherein, while the inner pipe is inserted in the outer pipe, a part of a pipe wall of the outer pipe corresponding to the joining concave is deformed to protrude inwardly in a radial direction of the pipe, so that the protruded part is fitted into the joining concave to determine a relative position of the outer pipe and the inner pipe, and fix the outer pipe and the inner pipe together.

* * * * *